US012695302B2

(12) United States Patent
Arifulla et al.

(10) Patent No.: US 12,695,302 B2
(45) Date of Patent: Jul. 28, 2026

(54) SYSTEMS AND METHODS FOR PREDICTING OUTAGES IN ELECTRICAL NETWORKS BASED ON VOLTAGE MEASUREMENTS FROM SCADA-ENABLED DEVICES

(71) Applicants:Ernst & Young U.S. LLP, New York, NY (US); Eversource Energy Service Company, Berlin, CT (US)

(72) Inventors: Mohammed Zaki Anwer Arifulla, Atlanta, GA (US); Michael N. Juchno, South Lyon, MI (US); Edwin D. Patterson, Jr., New Port Richey, FL (US); Raquel Solomon, New Britain, CT (US); Umair Zia, Shrewsbury, MA (US)

(73) Assignees: Ernst & Young U.S. LLP, New York, NY (US); Eversource Energy Service Company, Berlin, CT (US)

( * ) Notice: Subject to any disclaimer, the term of this patent is extended or adjusted under 35 U.S.C. 154(b) by 0 days.

(21) Appl. No.: 19/043,656

(22) Filed: Feb. 3, 2025

(65) Prior Publication Data

US 2025/0253655 A1    Aug. 7, 2025

Related U.S. Application Data

(60) Provisional application No. 63/549,897, filed on Feb. 5, 2024.

(51) Int. Cl.
H02J 3/0012 (2026.01)
H02J 3/001 (2026.01)
(Continued)

(52) U.S. Cl.
CPC ........ H02J 3/0012 (2020.01); H02J 3/00125 (2020.01); H02J 13/10 (2026.01); H02J 13/12 (2026.01); H02J 2103/30 (2026.01)

(58) Field of Classification Search
CPC ................ H02J 3/0012; H02J 3/00125; H02J 13/00001; H02J 13/00002; H02J 2203/20
See application file for complete search history.

(56) References Cited

U.S. PATENT DOCUMENTS 7,233,843 B2    6/2007  Budhraja et al.
8,234,017 B2    7/2012  Ahn
(Continued)

FOREIGN PATENT DOCUMENTS

CN    112182171 A    1/2021
CN    116775847 A    9/2023
(Continued)

OTHER PUBLICATIONS

Invitation to Pay Additional fees for PCT Application No. PCT/US2025/014292, mailed May 19, 2025; 10 pages.
(Continued)

*Primary Examiner* — Ziaul Karim
(74) *Attorney, Agent, or Firm* — COOLEY LLP

(57) ABSTRACT

According to an embodiment, a method includes receiving sensor data measured by a plurality of SCADA-enabled sensors associated with an electrical grid and identifying a plurality of momentary outages associated with the electrical grid based on the sensor data. The method further includes predicting (1) a plurality of possible sustained outages associated with the electrical grid based on the plurality of momentary outages and (2) a sustained outage likelihood from a plurality of sustained outage likelihoods for each
(Continued)

200 possible sustained outage from the plurality of possible sustained outages based on the plurality of momentary outages.

22 Claims, 16 Drawing Sheets

(51) Int. Cl.
| | |
|---|---|
| *H02J 13/10* | (2026.01) |
| *H02J 13/12* | (2026.01) |
| *H02J 103/30* | (2026.01) |

(56) References Cited

U.S. PATENT DOCUMENTS

| | | | | |
|---|---|---|---|---|
| 9,897,665 | B2 | 2/2018 | Taft | |
| 9,995,655 | B2 | 6/2018 | Dagnino et al. | |
| 10,033,176 | B2 | 7/2018 | Mousavi et al. | |
| 10,209,291 | B2 | 2/2019 | Sozer et al. | |
| 10,389,600 | B2 | 8/2019 | Aggarwal et al. | |
| 10,402,738 | B2 | 9/2019 | Li et al. | |
| 10,825,112 | B2 | 11/2020 | Sheng et al. | |
| 10,872,107 | B2 | 12/2020 | Ura | |
| 11,664,650 | B2 | 5/2023 | Harms et al. | |
| 11,726,436 | B2 * | 8/2023 | Hart | G05B 13/042 |
| | | | | 700/287 |
| 11,741,308 | B2 | 8/2023 | Balasubrahmanian et al. | |
| 12,068,927 | B1 * | 8/2024 | Mohebi | H04L 67/12 |
| 2010/0152910 | A1 * | 6/2010 | Taft | H02H 3/042 |
| | | | | 700/286 |
| 2010/0271802 | A1 * | 10/2010 | Recker | H05B 45/12 |
| | | | | 362/20 |
| 2011/0004446 | A1 * | 1/2011 | Dorn | H04L 43/0817 |
| | | | | 709/217 |
| 2011/0288692 | A1 * | 11/2011 | Scott | H04L 63/20 |
| | | | | 700/297 |
| 2012/0026726 | A1 * | 2/2012 | Recker | H05B 47/13 |
| | | | | 362/157 |
| 2012/0043889 | A1 * | 2/2012 | Recker | H05B 47/19 |
| | | | | 315/86 |
| 2012/0310423 | A1 * | 12/2012 | Taft | G06Q 50/06 |
| | | | | 700/286 |
| 2013/0070378 | A1 | 3/2013 | Witte | |
| 2013/0342131 | A1 * | 12/2013 | Recker | H05B 45/10 |
| | | | | 315/297 |
| 2014/0163759 | A1 * | 6/2014 | Anderson | G06Q 50/06 |
| | | | | 700/291 |
| 2015/0160296 | A1 | 6/2015 | Saarinen et al. | |
| 2016/0077164 | A1 | 3/2016 | Toyoshima et al. | |
| 2016/0276831 | A1 | 9/2016 | Karlak et al. | |
| 2018/0364295 | A1 * | 12/2018 | Schwartz | G06T 11/60 |
| 2020/0097060 | A1 * | 3/2020 | Hanna | G06F 1/3209 |
| 2021/0083506 | A1 * | 3/2021 | Rao | H02J 3/14 |
| 2021/0133234 | A1 | 5/2021 | Bedadala et al. | |
| 2023/0012038 | A1 * | 1/2023 | Iyer | G01R 31/086 |
| 2023/0128497 | A1 | 4/2023 | Vijayan et al. | |
| 2023/0170694 | A1 * | 6/2023 | Banerjee | H02J 3/00 |
| | | | | 703/18 |
| 2023/0259540 | A1 | 8/2023 | Das et al. | |
| 2023/0291230 | A1 * | 9/2023 | Eckhardt | H02J 13/12 |
| 2023/0299578 | A1 | 9/2023 | Spalt et al. | |
| 2023/0360151 | A1 | 11/2023 | Swamy | |
| 2024/0310892 | A1 * | 9/2024 | King | G06F 1/28 |
| 2025/0118962 | A1 * | 4/2025 | Richmond | H02J 3/001 |

FOREIGN PATENT DOCUMENTS

| | | | |
|---|---|---|---|
| EP | 4068551 | A1 | 10/2022 |
| WO | WO-2012061014 | A1 | 5/2012 |
| WO | WO-2025170857 | A1 | 8/2025 |

OTHER PUBLICATIONS

Author Unknown, "Chat with complex technical documents and get the answers you need," SpinDoc, Nov. 28, 2023. Retrieved from https://spindoc.ai/, [retrieved on Feb. 21, 2025]; 5 pages.

Author Unknown, "The Role of Remote Monitoring in Power Outage Restoration," UtilitiesOne, Sep. 8, 2023. Retrieved from https://utilitiesone.com/the-role-of-remote-monitoring-in-power-outage-restoration, [retrieved on Nov. 28, 2023]; 15 pages.

De Koninck, M., "Leveraging LLMs on your domain-specific knowledge base," ML6team, May 8, 2023. Retrieved from https://blog.ml6.eu/leveraging-llms-on-your-domain-specific-knowledge-base-4441c8837b47, [retrieved on Feb. 21, 2025]; 8 pages.

Formea, J. et al., "Improve power reliability through small-scale SCADA systems," Eaton intelligent power management company, Jul. 21, 2016. Retrieved from https://www.eaton.com/nz/en-gb/markets/utilities/knowledge-center/power-reliabilty-through-small-scale-SCADA-systems.html, [retrieved on Feb. 21, 2025]; 10 pages.

Goforth, E. et al., Network Analytics for Infrastructure Asset Management Systemic Risk Assessment, Journal of Infrastructure Systems, [Epub Feb. 10, 2022]; Jun. 2022, 28(2):04022006; 17 pages.

Gould, K., "Eversource Wins 2021 Achievement Award from Association of Edison Illuminating Companies," EIN Presswire, Oct. 28, 2021. Retrieved from https://www.einpresswire.com/article/554913096/eversource-wins-2021-achievement-award-from-association-of-edison-illuminating-companies, [retrieved on Feb. 21, 2025]; 3 pages.

Mirshekali, H. et al., "A Survey of Time-Series Prediction for Digitally Enabled Maintenance of Electrical Grids," Energies, Aug. 31, 2023, 16(17):6332; 29 pages.

Mirshekari, S., "Data-Driven Fault Detection in Power and Utility Distribution Networks," O'Fallon Labs, Sep. 4, 2023. Retrieved from https://saeedmirshekari.com/blog/data-driven-fault-detection-in-power-and-utility-distribution-networks/, [retrieved on Feb. 21, 2025]; 7 pages.

Srivastava, I. et al., "Fault Detection, Isolation and Service Restoration in Modern Power Distribution Systems: A Review," Energies, Oct. 3, 2022, 15(19):7264; 26 pages.

Zia, U. et al., "Experience The Energy Movement," [presentation]. Distributech International, presented Feb. 7-9, 2023; San Diego Convention Center, San Diego, CA; Eversource and Emst Young; 18 pages.

International Search Report and Written Opinion for International Application No. PCT/US2025/014292, by Eversource Energy Service Company, mailed Jul. 11, 2025; 14 pages.

* cited by examiner

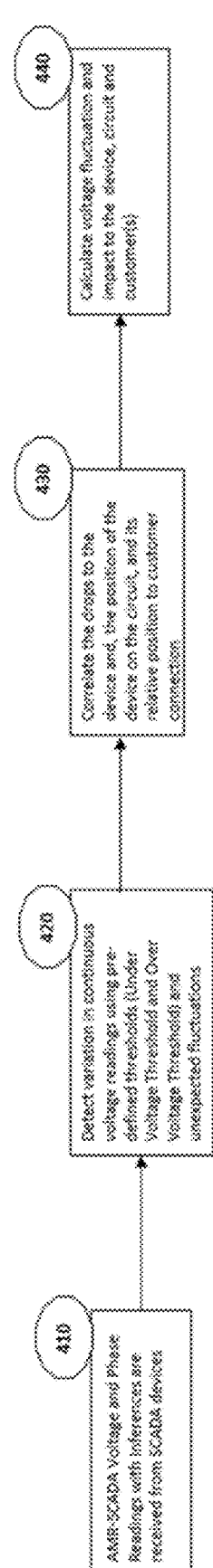

400

410 AMR/SCADA Voltage and Phase Readings with inferences are received from SCADA devices 420 Detect variation in continuous voltage readings using pre-defined thresholds (Under Voltage Threshold and Over Voltage Threshold) and unexpected fluctuations 430 Correlate the drops to the device and, the position of the device on the circuit, and its relative position to customer connection 440 Calculate voltage fluctuation and impact to the device, circuit and customer(s)

FIG. 4

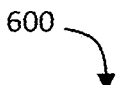
600
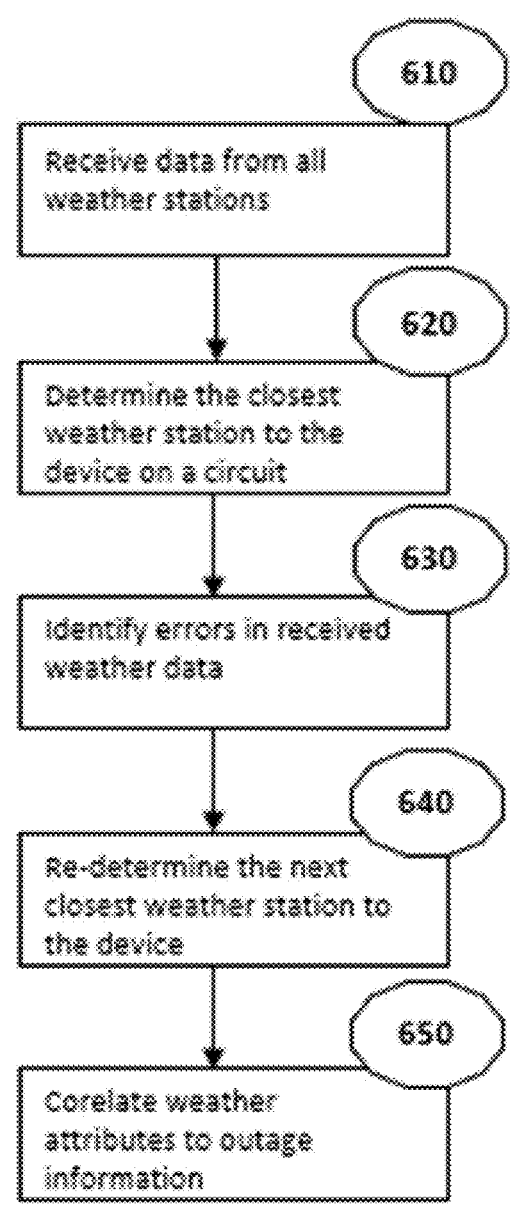
610
Receive data from all weather stations
620
Determine the closest weather station to the device on a circuit
630
Identify errors in received weather data
640
Re-determine the next closest weather station to the device
650
Corelate weather attributes to outage information
FIG. 6

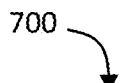
700
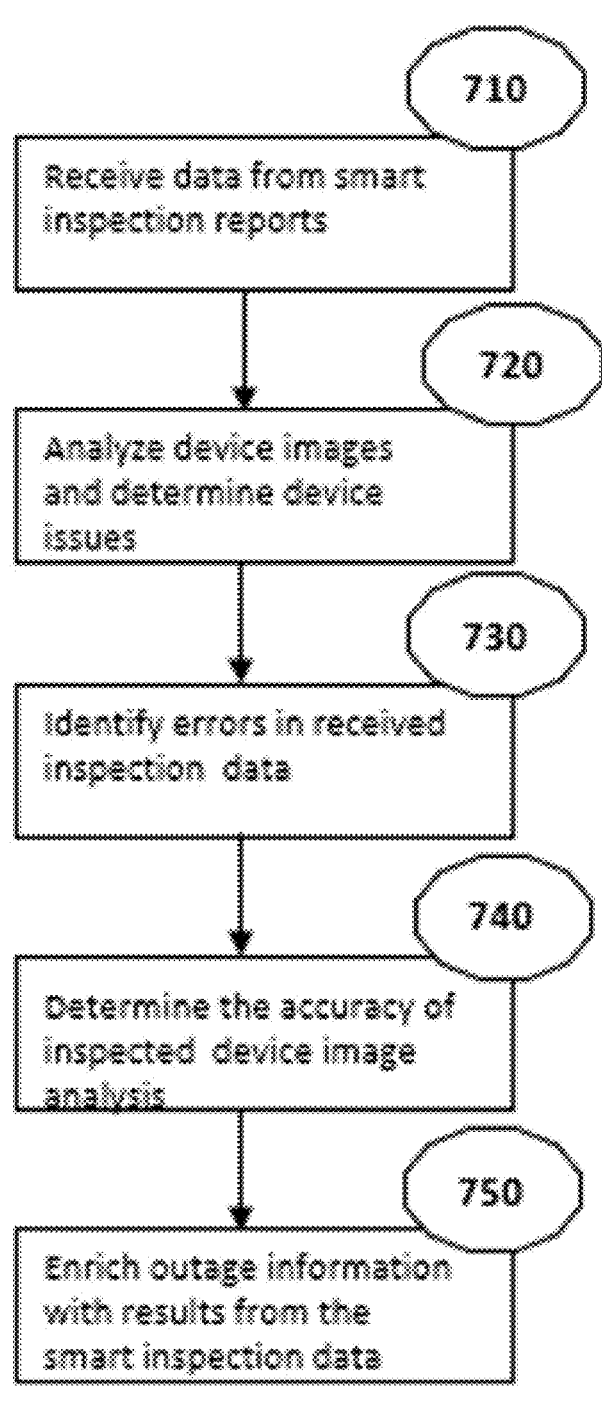
710
Receive data from smart inspection reports
720
Analyze device images and determine device issues
730
Identify errors in received inspection data
740
Determine the accuracy of inspected device image analysis
750
Enrich outage information with results from the smart inspection data
FIG. 7

1400

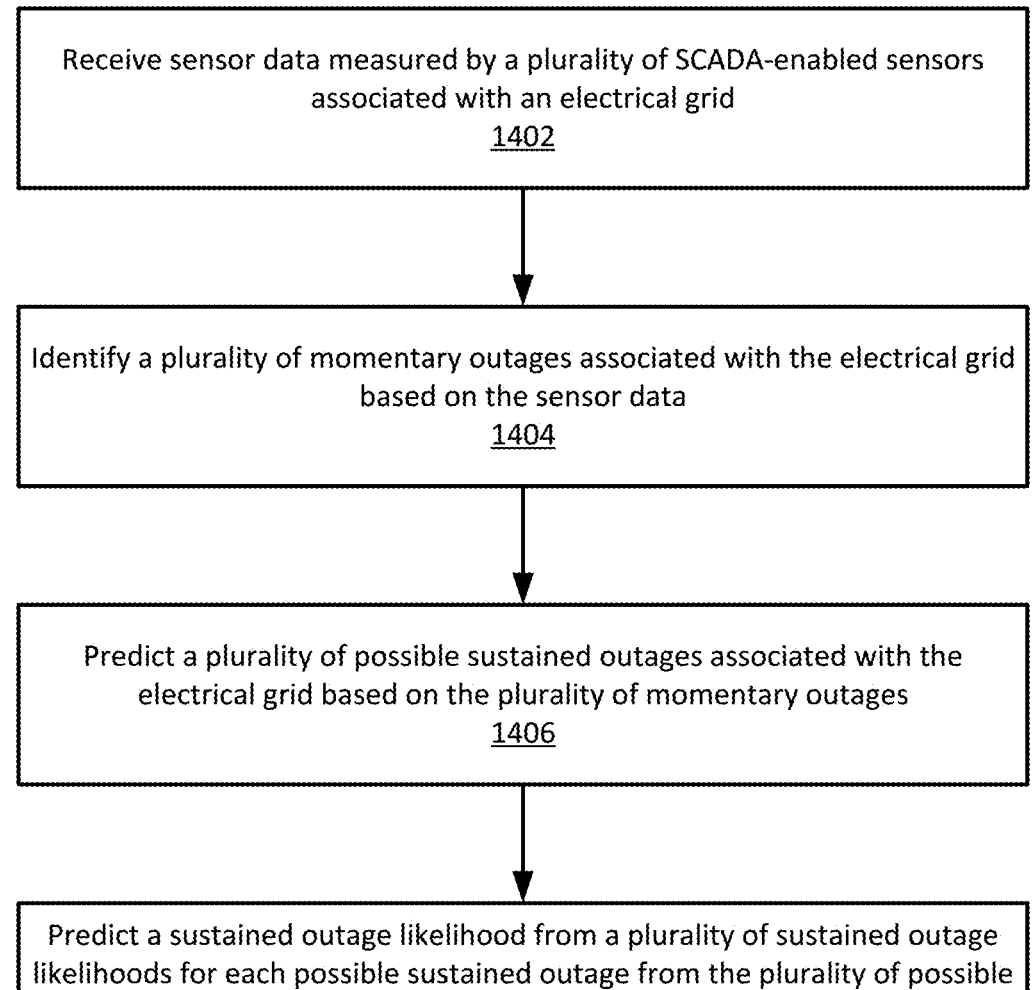

Receive sensor data measured by a plurality of SCADA-enabled sensors associated with an electrical grid
1402

Identify a plurality of momentary outages associated with the electrical grid based on the sensor data
1404

Predict a plurality of possible sustained outages associated with the electrical grid based on the plurality of momentary outages
1406

Predict a sustained outage likelihood from a plurality of sustained outage likelihoods for each possible sustained outage from the plurality of possible sustained outages based on the plurality of momentary outages
1408

FIG. 14

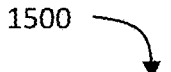

1500

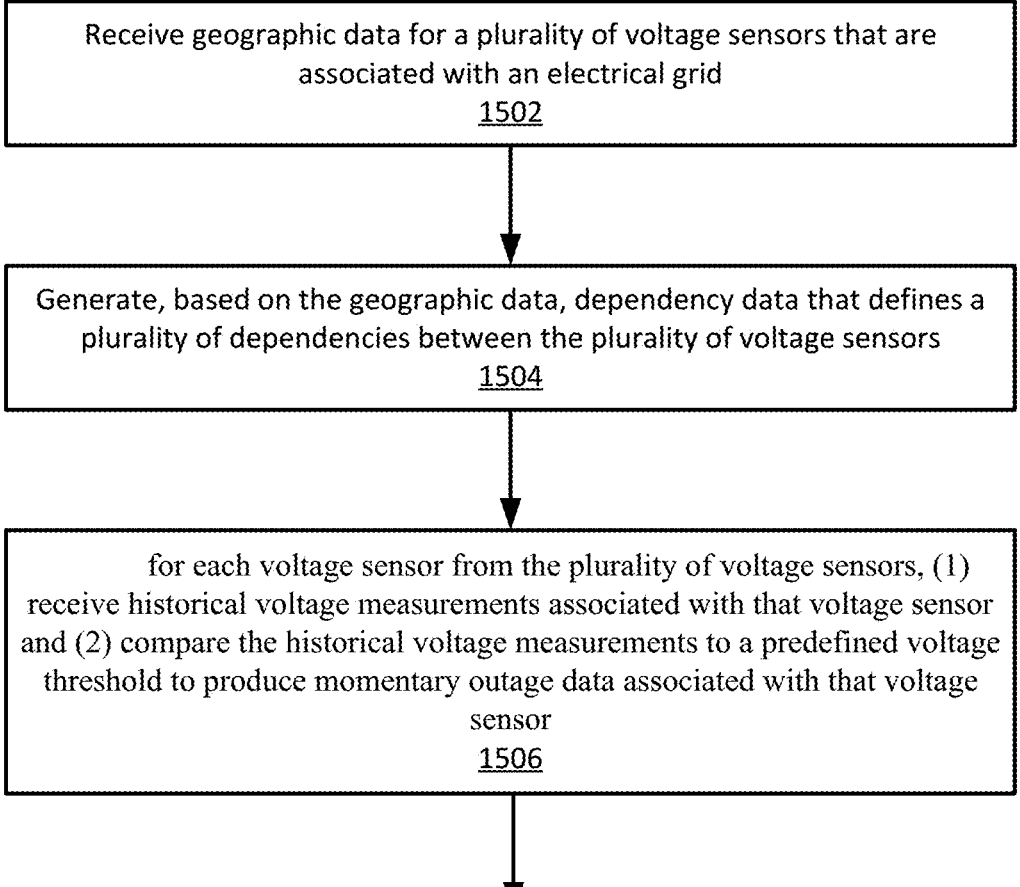

Receive geographic data for a plurality of voltage sensors that are associated with an electrical grid
1502

Generate, based on the geographic data, dependency data that defines a plurality of dependencies between the plurality of voltage sensors
1504 for each voltage sensor from the plurality of voltage sensors, (1) receive historical voltage measurements associated with that voltage sensor and (2) compare the historical voltage measurements to a predefined voltage threshold to produce momentary outage data associated with that voltage sensor
1506

Train a machine learning model to predict a sustained outage event for a location within the electrical grid based on (1) the geographic data, (2) the dependency data, and (3) the momentary outage data, for each voltage sensor from the plurality of voltage sensors
1508

FIG. 15

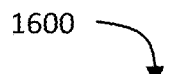

1600

```
┌─────────────────────────────────────────────────────────────┐
│  Receive voltage data from a SCADA-enabled sensor that is     │
│  associated with an electrical grid                           │
│                         1602                                  │
└─────────────────────────────────────────────────────────────┘
                              │
                              ▼
┌─────────────────────────────────────────────────────────────┐
│  Detect a plurality of momentary outage events based on the   │
│  voltage data to produce momentary outage data                │
│                         1604                                  │
└─────────────────────────────────────────────────────────────┘
                              │
                              ▼
┌─────────────────────────────────────────────────────────────┐
│  Provide the momentary outage data as input to a machine      │
│  learning model to predict a sustained outage event           │
│                         1606                                  │
└─────────────────────────────────────────────────────────────┘
                              │
                              ▼
┌─────────────────────────────────────────────────────────────┐
│  In response to predicting the sustained outage event,        │
│  identify an electrical consumer based on (1) geographic data  │
│  associated with the SCADA-enabled sensor and (2) dependency  │
│  data associated with a plurality of SCADA-enabled sensors     │
│  that includes the SCADA-enabled sensor                        │
│                         1608                                  │
└─────────────────────────────────────────────────────────────┘
                              │
                              ▼
┌─────────────────────────────────────────────────────────────┐
│  Send a signal indicating a remedial action based on an       │
│  identity of the electrical consumer                          │
│                         1610                                  │
└─────────────────────────────────────────────────────────────┘
```

FIG. 16

SYSTEMS AND METHODS FOR PREDICTING OUTAGES IN ELECTRICAL NETWORKS BASED ON VOLTAGE MEASUREMENTS FROM SCADA-ENABLED DEVICES

CROSS-REFERENCE TO RELATED APPLICATIONS

This application claims the benefit and priority to U.S. Patent Application No. 63/549,897, filed Feb. 5, 2024 and titled "Systems and Methods for Predicting Outages within an Electrical Grid," the contents of which are hereby incorporated by reference.

FIELD

This disclosure relates to detecting and analyzing momentary outages and power quality issues (voltage and current fluctuations), for an automatic meter reader (AMR)-metered customer base and combining those insights with sustained outage analyses to create comprehensive reliability insights, which can be used to predict the potential for sustained outages on the energy distribution grid.

BACKGROUND

Detecting and analyzing short-duration outages and power quality issues experienced by customers is a complex process, which often relies upon customer complaints to initiate an investigation. Without the benefit of an AMI (Advanced Metering Infrastructure) infrastructure, the process of identifying power/energy interruption increases in complexity as automatic meter reader (AMR) data does not provide real-time insights. The effort to isolate distribution assets and reconcile data across multiple systems that contribute to outages less than, for example, 5 minutes in duration (e.g., "momentary outages") is inefficient and resource intensive. Furthermore, relying upon customer calls to create awareness of these momentary interruptions, which are then subsequently investigated, is a driver of customer dissatisfaction.

Over the past few decades, utilities have increasingly deployed automation devices to restore outages. Although these automation devices have resulted in reducing sustained outages, they are causing more momentary interruptions (by the inherent design).

Customer dissatisfaction also correlates with overall degradations in power reliability, specifically, sustained outages which are power interruptions equal to or greater than 5 minutes in duration. Unplanned sustained outages can be caused by several factors, including extreme weather events and equipment failures, whereas momentary outages are transitory in nature for any number of reasons.

Greater insights in momentary and sustained outages is desirable. A data model that connects disparate data across multiple systems through links and relationships theoretically can provide greater insights in momentary and sustained outages. Without AMI, however, the ability to develop a data model leveraging sensor data on the power grid provides significant challenges due to the complexity of the data relationships across systems that are undefined.

Momentary and sustained outage analyses have historically been viewed and treated independently—the former with great difficulty. Power reliability, however, is a spectrum which, when viewed comprehensively or holistically, enables the identification of momentary outage and voltage dip patterns and trends that can be used to predict the possibility of sustained outages. Thus, a need exists to combine an outage view consisting of momentary and sustained outage data along with semi-automated insights to predict possible sustained outages.

SUMMARY

The following summary is not intended to provide an exhaustive overview of the one or more embodiments described herein that automate the integration of data from multiple systems and data sources to methodically identify momentary outages, power quality issues, automating load forecasts, and provide a holistic view of the electrical network to address the problem. This summary serves as an introduction to the detailed description which subsequently follows.

One or more embodiments capture sensor data, as reported by SCADA-enabled devices, to which multiple custom algorithms are applied that identify momentary outages and voltage variations. The results are a unified view of momentary and possible sustained outages that are clearly presented in time, region, devices, circuits, and customer data visualizations. The dynamic visualizations support multiple personas, or classes of users who have varying business and operational needs while also providing a comprehensive, granular filter pane for in-depth drill downs. One or more embodiments accelerate system-wide outlook on complete reliability by providing a holistic view of the electrical network, capturing information on momentary and possible sustained outages, including weather information, power quality, poorly performing circuits, corporate metrics, and seasonal peak current values (e.g., Load Book).

One or more embodiments capture multiple channels of sensor data as reported by SCADA-enabled devices via Enterprise PI, from which the one or more embodiments identifies and calculates momentary outages. The one or more embodiments apply algorithms to identify both under 1 minute and 1-to-5-minute momentary outages based on both 60% and 90% deviation in voltage. To account for errors, and the fact that the voltage drop during a momentary outage sometimes may not truly go down to 0 volts, the Institute of Electrical and Electronics Engineers (IEEE) specified 90% voltage deviation is used as a definition or example of a "momentary outage."

One or more embodiments capture circuits, devices, customers, and location data, and give users the ability to slice and dice outage data across time and captured data, allowing engineers to identify and investigate the source of such interruptions, while also enabling them with automated insights that can be used to improve (or optimize) reliability investments. Outage metrics are based on frequency, duration, and customer counts. While customer counts for sustained outages are actual customer counts, momentary outages are estimated based on the number of customers downstream from the location of the device from which the momentary outage was detected.

In one or more embodiments, the device and the date-time of the outage can be used to uniquely identify an outage on a device. Information about every customer that experiences an outage on a device each second is captured. Using this information, the embodiment(s) calculates and reports the metric Momentary Average Interruption Frequency Index (MAIFI).

One or more embodiments predict sustained outages based on momentary outage insights using three models: (1)

Sustained Outage Predictive Model: (2) Predicted Cause Model; and (3) Confidence Score Regression Model.

In one or more embodiments, a method includes receiving sensor data measured by a plurality of SCADA-enabled sensors associated with an electrical grid and identifying a plurality of momentary outages associated with the electrical grid based on the sensor data. The method further includes predicting a plurality of possible sustained outages associated with the electrical grid based on the plurality of momentary outages and predicting a sustained outage likelihood from a plurality of sustained outage likelihoods for each possible sustained outage from the plurality of possible sustained outages based on the plurality of momentary outages.

In one or more embodiments, a non-transitory, processor-readable medium stores instructions that, when executed by a processor, cause the processor to receive geographic data for a plurality of voltage sensors that are associated with an electrical grid and generate, based on the geographic data, dependency data that defines a plurality of dependencies between the plurality of voltage sensors. For each voltage sensor from the plurality of voltage sensors, historical voltage measurements associated with that voltage sensor is received and compared to a predefined voltage threshold to produce momentary outage data associated with that voltage sensor. A machine learning model is trained to predict a sustained outage event for a location within the electrical grid based on (1) the geographic data, (2) the dependency data, and (3) the momentary outage data, for each voltage sensor from the plurality of voltage sensors.

In one or more embodiments, a non-transitory, processor-readable medium stores instructions that, when executed by a processor, cause the processor to receive voltage data from a SCADA-enabled sensor that is associated with an electrical grid and detect a plurality of momentary outage events based on the voltage data to produce momentary outage data. The momentary outage data is provided as input to a machine learning model to predict a sustained outage event. In response to predicting the sustained outage event, an electrical consumer is identified based on (1) geographic data associated with the SCADA-enabled sensor and (2) dependency data associated with a plurality of SCADA-enabled sensors that includes the SCADA-enabled sensor. A signal indicating a remedial action is sent based on an identity of the electrical consumer.

BRIEF DESCRIPTION OF THE DRAWINGS

FIG. 4 is a flowchart of the calculation process for capturing and attributing voltage fluctuations to circuits, devices, and customers, according to an embodiment.

FIG. 6 is a flowchart of weather station and weather-to-outage correlation process, according to an embodiment.

FIG. 7 is a flowchart of the outage data and image enrichment process with smart inspection data and image analysis, according to an embodiment.

FIG. 14 is a flowchart of a method implemented by an outage prediction system to predict sustained outage likelihoods, according to an embodiment.

FIG. 15 is a flowchart of a method implemented by an outage prediction system to predict sustained outage events, according to an embodiment.

FIG. 16 is a flowchart of a method implemented by an outage prediction system to identify electrical consumers and facilitate remedial actions, according to an embodiment.

DETAILED DESCRIPTION

Identify, Analyze, and Report Circuit and Device Reliability & Outages

The effort to detect and analyze momentary (<5 minute) outages for an automatic meter reader (AMR)-metered customer base is resource intensive, typically involving identification of data quality issues from faulty sensors and subsequent data remediation, manual identification and reconciliation of data across multiple systems, and custom calculations—often under pressure because of a customer (also referred to herein as an electrical consumer) complaint.

In one or more embodiments, the integration of data from multiple systems is automated to provide a holistic view of the electrical network. Alongside momentary outages, sustained outages are captured to provide a window into the full outage experience. By capturing sensor data (e.g., from voltage sensors), as reported by supervisory control and data acquisition (SCADA)-enabled devices, the one or more embodiments apply multiple custom algorithms that identify momentary outages thus reducing, and in most cases eliminating manual effort, by harnessing underutilized sensor data from the distribution grid captured in software such as the AVEVA™ PI System™ (former known as the OSIsoft® PI System) that stores data. Part of the reason that this data source was underutilized was because it was based on 'PI tags'—sensor data identifiers—that were not correlated with other device identifiers in related systems. No known source system includes the corresponding PI tag for a given SCADA device.

A momentary outage can include a brief (e.g., less than five minutes) loss of power delivery to one or more customers caused by an opening and/or closing operation of an interrupting device (e.g., a recloser, circuit breaker, switch, contactor, etc.). Two or more circuit breaker and/or recloser operations (e.g., an open operation followed by a close operation) that briefly interrupt service to one or more customers can be defined as two momentary interruptions. A momentary outage event can include an aggregation of all momentary interruptions of one or more reclosing types of interrupting devices, completed within a predefined time (e.g., 5 minutes or less) that do not result in a sustained loss of power delivery to one or more customers. If a recloser and/or circuit breaker operates two, three, or four times and then remains closed within a predefined time (e.g., 5 minutes or less of the first operation), those momentary interruptions can be considered one momentary interruption event. Any outage not classified as being a part of a momentary outage event can be referred to as a sustained outage.

Figure 1:
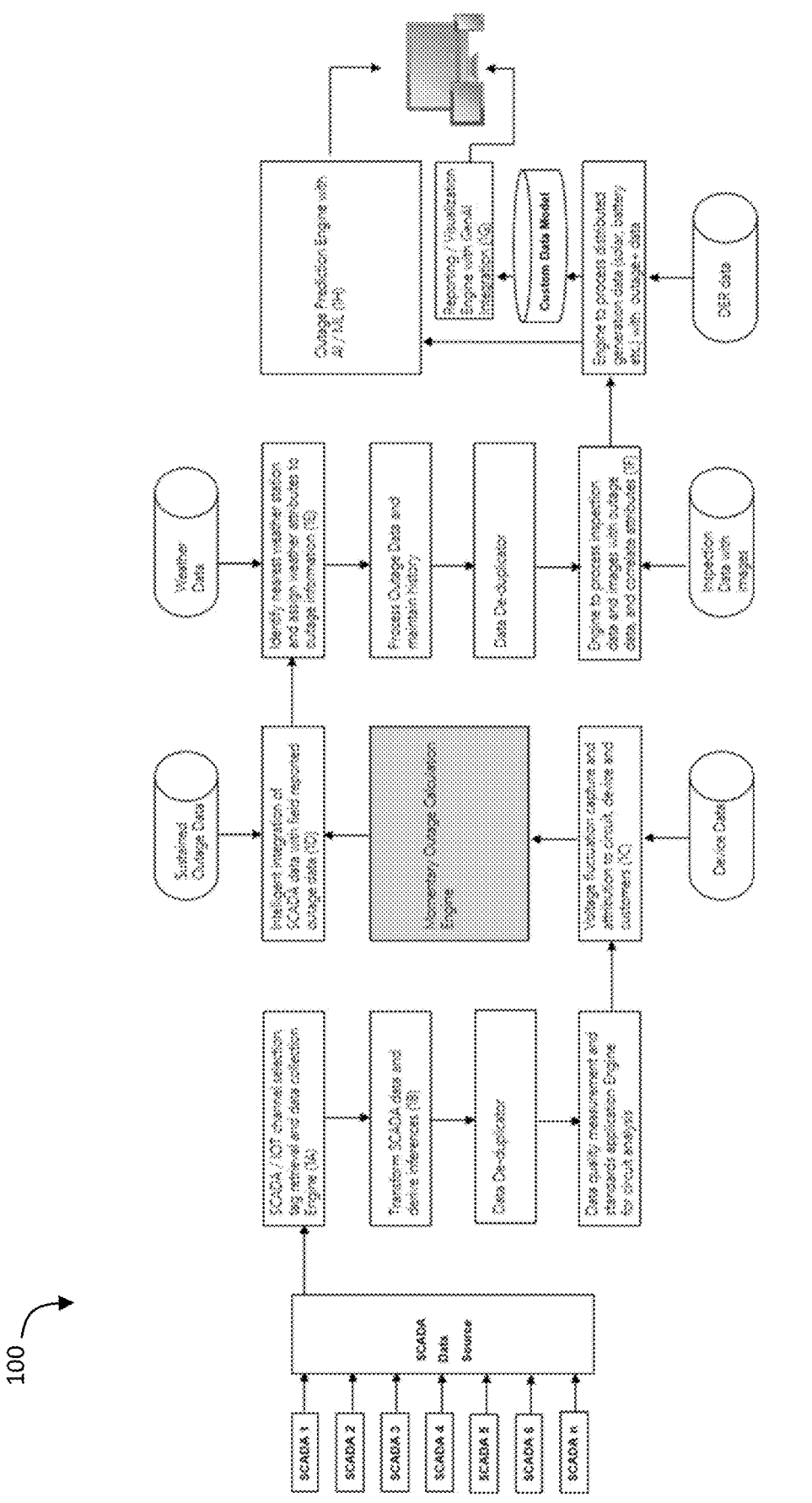
FIG. 1 is a flowchart for identifying, analyzing, and reporting circuit and assets within an electrical grid, according to an embodiment.

FIG. 1 is a comprehensive flowchart depicting a process 100 for identifying, analyzing, and reporting circuit and device reliability and outages within an electrical grid, according to an embodiment. Various steps shown in FIG. 1 reference additional processes that are shown in FIGS. 2-8 and are discussed below. For example, the SCADA channel selection, tag retrieval and data collection engine are further illustrated in and discussed with respect to FIG. 2.

The SCADA system present in an electrical power distribution system collects sensor data from SCADA-enabled reclosers, switches, frequency meters, voltage meters, circuit segments, and other SCADA-enabled devices. A SCADA-enabled device can include a device configured for use in supervision of an electrical grid (e.g., circuits within an electrical grid) and can exclude, for example, a power-line, capacitor bank, transformer, and/or the like. SCADA sensor data is collected and stored in data capture software such as the PI Historian of the AVEVA™ PI System™, which records data values over time in a time-series database. In some instances, a SCADA-enabled device can be and/or include a sensor that is connected to and/or within a sensing range of an electrical grid. Distribution system circuits, devices, organizational structures, and customers are sourced from geographic information system (GIS) via software that provides outage management and advanced distribution management functions such Oracle®: Utilities Analytics (OUA). QUA serves as the Network Management System's (NMS's) reporting and data access solution. OUA supplies the circuits, devices and customer data used to calculate the effects of an outage on customers. OUA also provides sustained outage events recorded in NMS that flows through OUA. The embodiment combines PI and OUA outage data into new circuit reliability insights (e.g., as represented by equipment reliability data, such as mean time to failure data, mean time to repair data, availability data, failure rate, etc.). It should be understood that although PI and OUA are mentioned herein and refer to specific third-party software, other software systems/modules that provide similar functionality can be included in some embodiments or implementations.

To address a challenge in identifying the specific customers affected by a momentary outage, an algorithm identifies downstream network devices for a given SCADA device and uses customer data to link the equipment at the customer's service point to the proper device. With this linkage in place, a momentary outage identified at a SCADA device immediately shows the specific customers impacted.

This approach accelerates the detection and analysis of momentary outages to efficiently address reliability, regulatory, customer satisfaction, and device management requirements, while simultaneously providing new insights into existing data by ending the isolated treatment of momentary and sustained outages within an embodiment that identifies momentary outages considering sustained outages occurring concurrently.

Data is loaded into the database using an enterprise data management system (such as Informatica®) that acts as an ETL embodiment, connecting to and extracting data from various source systems and loading retrieved data into target tables and files. This functionality includes storing data in parameters so that configuration values can be passed between Informatica® and the embodiment's database. It should be understood that although Informatica® is mentioned herein and refers to specific third-party software, other software systems/modules that provide similar functionality can be included in some embodiments or implementations.

Informatica® uses the following components, which are defined here: A workflow is a set of tasks linked to achieving a common goal. A workflow runs sessions that tell the Integration Service how to move data between sources and targets. Sessions are associated with mappings. Mappings include transformations that define the rules of transformation. The embodiment implements workflows, sessions, and mappings to move OUA, PI and Weather data from Source Systems to the embodiment's database.

The QUA extraction process consists of Informatica® mappings & workflow that connect directly to the OUA database. OUA data within pre-defined views are copied from the source database to the embodiment's database. All data extracted from OUA are snapshots for a given day.

The embodiment utilizes an automated job scheduling and monitoring solution such as Autosys by Broadcom®. Every Informatica® workflow is associated with an Autosys Job Information Language (JIL) file and has a scheduled run time. Autosys jobs regularly check for a job to run, and when the condition is satisfied, the JIL file is executed to run the scheduled workflow.

The OUA database views (including circuits, devices, customers, organization levels, and sustained outage events) are loaded through Informatica® workflows and mappings via a connection to the OUA database and then loaded into the embodiment's database.

Data within the OUA database views is loaded incrementally. The OUA snapshot data is valid on the date of load. OUA data is loaded by truncating the existing data in the embodiment's database and by performing a fresh load daily. The Informatica® mappings connect to the OUA database views and load data to the respective tables in the embodiment's database.

Weather data including hourly observations is loaded every day and includes data from the previous day using Informatica® mappings and workflows. The embodiment's database stores historical data for up to 3 years.

The embodiment leverages a unidirectional data flow process. Data is sourced from source systems and processed in a staging area of the embodiment's database. The staging area includes data from all the relevant tables or views from source systems. The data from the staging area is then processed into the operational data store area. In the operational data store area, primary and foreign keys are established, and the data is then processed to the reporting area where data transformations are performed. Finally, data in the reporting area data is fed into Power BI for data visualization.

As also shown in FIG. 1, the data model design allows for inclusion of additional data sources. The following sections define the data model design.

The data model includes geographic regions associated with the electrical grid (e.g., all geographic regions in which the electrical grid is located) and has multiple circuits (e.g., in one example, approximately 8,700 circuits). For an example having 8,700 circuits, the circuits have 12,000 SCADA-enabled devices that transmit data to PI Historian. Each device is tied to (associated with) customers and outage events. By relating customers and outage events through devices, the number of customers affected and the unique customers themselves can be predicted. The geographic regions can be, for example, represented by geographic location data (e.g., longitude data, latitude data, etc.).

Parent-child master dimensions and combined outages entities are derived/calculated tables. Other tables are filled with data directly from source systems. No history of changes to values in the derived/calculated tables are maintained. The purpose of each entity is detailed as follows.

The circuit dimension includes relevant circuit level attributes such as circuit operating voltage and circuit name.

The device (or asset) dimension includes relevant device level attributes such as SCADA Device ID, operating voltage, Parent-Child IDs, and the number of electrical customers served.

The outage event type dimension determines the type of outage based on a duration (e.g., a duration in minutes) and can be manipulated to accommodate changes in outage definitions.

The organization dimension includes relevant organization level attributes such as Area Work Center (AWC), Region, Town, State, and Company.

The weather station dimension includes relevant station information along with latitude and longitude.

The time dimension includes unique row for time with attributes such as full time, hour, minutes, and seconds allowing data to be drilled down based on time granularity.

The date dimension includes a unique row for every day with attributes such as full date. Using a date dimension table can be used for Power BI development. It allows for complex calculations (such as rolling 12-month averages) while limiting file size and maximizing report performance.

The parent-child master dimension (also referred to herein as a dependency matrix having dependency data) is a derived table including each downstream component for every unique device for all circuits. This data structure allows the embodiment to display customer level granularity within the reports and determine which components are affected by upstream outages. In some implementations, the parent-child dimension/table includes (or leverages/facilitates) relational data structures to establish relationship between upstream and downstream devices, such that a relative position of a device on a line/circuit can be determined and a number of customers that can be impacted in the event of an outage can be calculated. The parent-child master dimension/table defines a child identifier (ID) and a parent identifier (ID) for each device of the electrical grid. The child ID represents the identifier of the given device, and the parent ID represents the identifier of the upstream (e.g., immediately upstream) device electrically connected, in a nominal (e.g., normal operation) circuit configuration, to the given device according to the designed power flow path from a primary power provider (e.g., a provider substation, feeder circuit, etc.).

In some implementations, the parent-child dimension (e.g., data within the dimension/table) can be provided as input to a machine learning model (e.g., a decision tree, random forest, gradient boosting machine (GBM), support vector machine (SVM), etc.) to determine downstream effects of a device represented in the parent-child dimension. In some implementations, an outage prediction system can be configured to perform a look up operation within the parent-child dimension in response to predicting a sustained outage event for a device. The outage prediction system can execute the look up operation to identify the device represented in the parent-child dimension and further identify downstream devices and/or customers that can be affected by the predicted outage at the device. Alternatively or in addition, the sustained outage prediction system can be further configured to predict a device that, if maintained, repaired, replaced, and/or upgraded, can improve performance of the electrical grid. For example, the outage prediction system can record within the parent-child dimension (or a similar data structure) a count value, for each device represented in the parent-child dimension, of sustained outage predictions generated by the outage prediction system. If the count value for a given device exceeds a predetermined threshold, the outage prediction system can automatically trigger an action (e.g., automatically cause the device to power-cycle, reset, etc.) and/or indicate (e.g., via a graphical user interface) that the device should be maintained, repaired, and/or replaced.

In some implementations, the outage prediction system can be configured to use the parent-child dimension as an initial search space to perform an optimization (e.g., a gradient descent, an evolutionary algorithm-based search, etc.) to identify permutations of device parameters that can reduce an overall likelihood of a sustained outage within the electrical grid. Examples of device parameters for a given grid device can include device capacity (such as transformer power capacity, capacitor capacitance, etc.), device redundancy, device reliability (e.g., failure in time (FIT), etc.), and/or the like. In some implementations, the outage prediction system can optimize device configuration based on a cost constraint. For example, the outage prediction system can optimize (or improve) a number of devices to be repaired and/or replaced based on a total budget that can allocated among the number of devices. Similarly, the outage prediction system can be configured to determine whether to repair and/or replace a device based on downstream effects associated with the repair and/or replacement, such as a downstream outage while the device is being repaired and/or replaced. For example, while a replacement of an upstream device can better reduce the likelihood of a sustained outage more than replacement of a downstream device, the sustained outage prediction system can assess a cost constraint and/or a downstream effect constraint while performing the optimization to determine that increased cost and/or downstream effects associated with replacement of the upstream device offsets the increase in electrical grid performance. Thus, the outage prediction system can recommend instead to replace the downstream device.

The customer dimension includes relevant customer level attributes such as service account number, customer name, customer address, customer criticality, and service transformer code.

The weather fact includes relevant weather observation data for every hour such as weather code, description, wind gust, direction, precipitation, etc.

The combined outages table is a comprehensive events table comprising outages detected by PI system and those captured by the OUA system. For the PI outages, attributes such as the SCADA device number, circuit, outage begin and end dates, voltage drops, and spikes are captured. Outages that are captured by both PI and OUA systems are matched. Outages that occur on devices within the same circuit within a predefined period of time (e.g., within 5 minutes) are tagged as a single outage. Devices are tagged in the order of their position within the circuit. PI outages can be calculated and matched with corresponding OUA outage entries.

Figure 2:
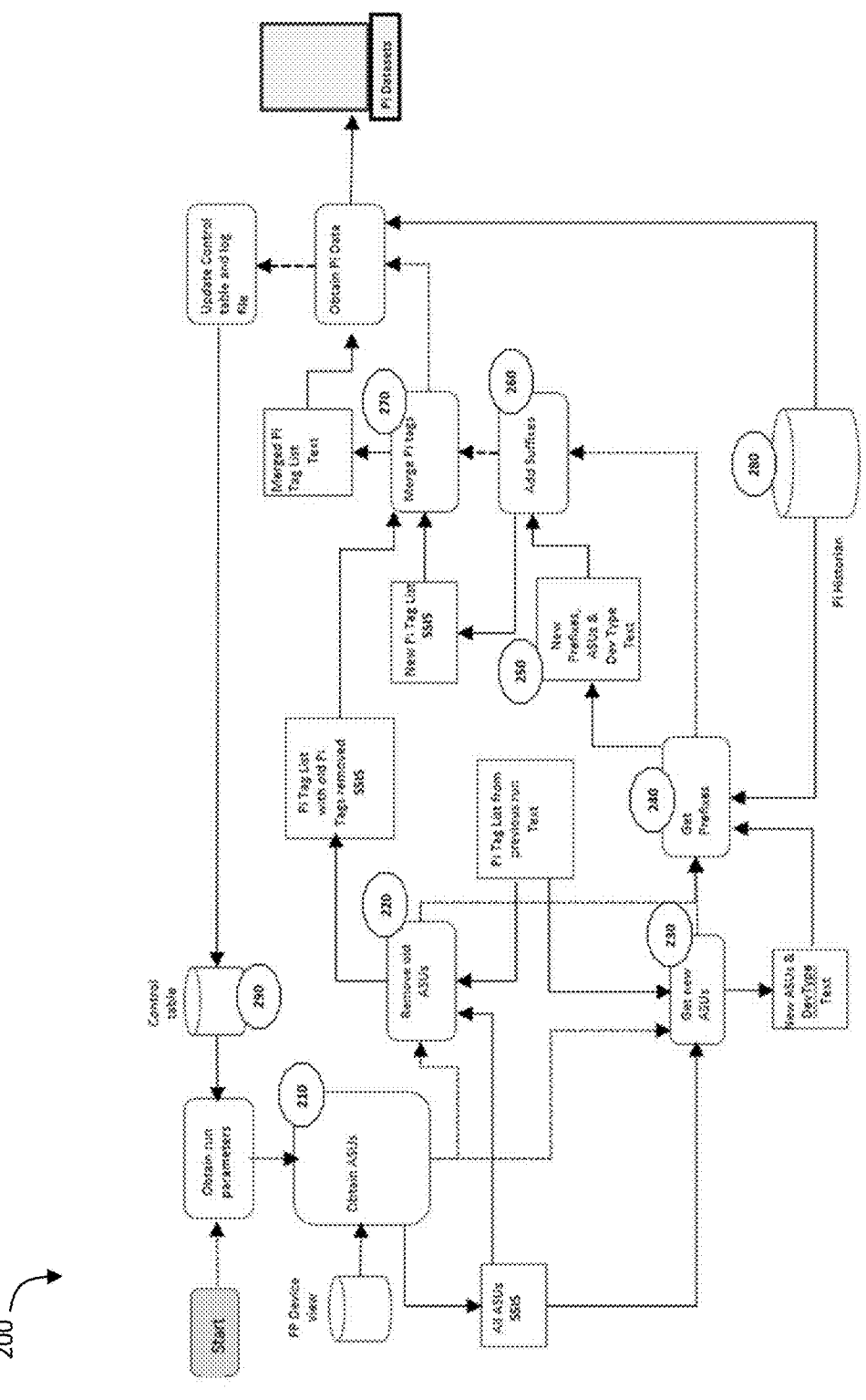
FIG. 2 is a flowchart depicting the method for acquiring SCADA sensor data, according to an embodiment.

SCADA Sensor Data Acquisition Method (See FIG. 2)

As shown in FIG. 2, the proper PI tags for each device are determined based on the SCADA identifier and device type, and the sensor data used to accurately identify momentary outages are extracted.

The SCADA sensor data acquisition method 200 shown in FIG. 2 collects PI data from SCADA devices based on the PI tag associated with a given device. At 210, the list of current devices in the network and their PI tag are obtained because devices are added to and removed from the electrical network (electrical grid) on a daily basis. Comparing the list of current devices to the list of devices identified in the previous day, at 220 devices that have been removed from the network are deleted and at 230, devices that are new to the network (230) are added. At 240, 250 and 260, the PI tag(s) to associate with new devices are determined. At 270, the list of existing devices and their PI tags are merged with the list of new devices and their PI tags. At 280, his list is then used to extract PI data from PI Historian. The extract will pick up a days' worth of data for all SCADA reporting devices. At 290, a record of the last extraction date is kept in a parameter control table in the embodiment's database so that if needed, the extract process can collect data from the last time it was run to maintain a consistent record of all PI sensor data.

Figure 3:
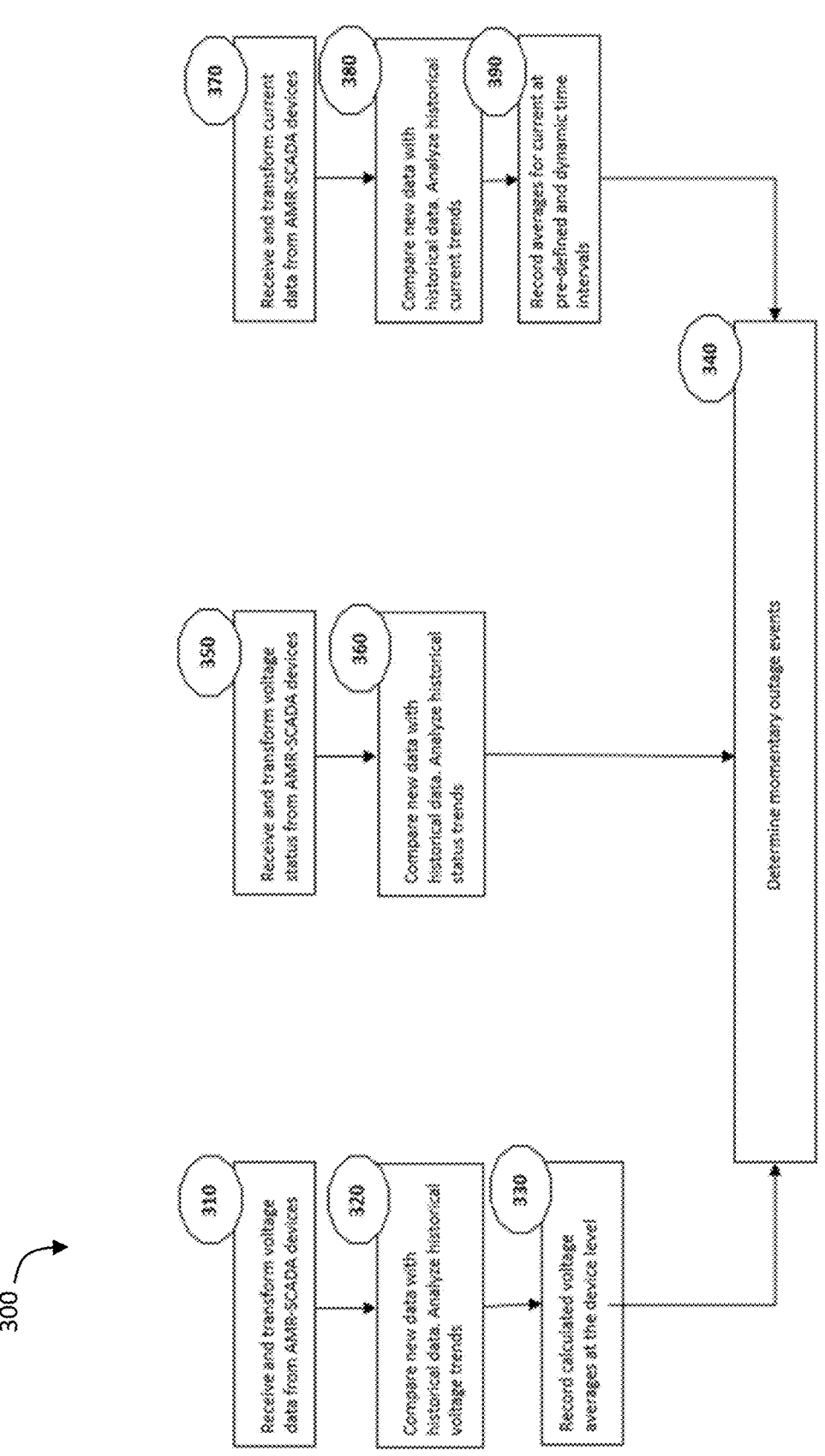
FIG. 3 is a flowchart depicting the SCADA Sensor Data Transformation & Inference Deriving Process, according to an embodiment.

SCADA Sensor Data Transformation & Inference Deriving Process (See FIG. 3)

As indicated in FIG. 3, a process 300 is designed to transform the AMR/SCADA sensor voltage readings to determine the occurrence or the lack thereof of a momentary outage event, according to an embodiment. Note that reference is made to the devices shown in FIG. 10, discussed herein. At 310, the AMR-SCADA sensor voltage data is received through the processes of a sensor (e.g., that is functionally and/or structurally similar to the sensor 1004 of FIG. 10) capturing information from a device (1002) and sending this information to a remote terminal unit (e.g., that is functionally and/or structurally similar to the remote terminal unit 1006 of FIG. 10), which transmits this information to the PI collection server (e.g., that is functionally and/or structurally similar to the PI collection server 1008 of FIG. 10). At 320, an Extract, Transform & Load (ETL) server (e.g., that is functionally and/or structurally similar to the ETL server 1020 of FIG. 10) compares new data collected with historical data (e.g., historical voltage measurements) to analyze discrepancies and/or outliers/anomalies. An effort is made to identify the root-cause of the deviation. At 330, the voltage average readings are calculated for pre-defined intervals to maintain consistency across the years that the data was collected at the device level. At 340, the occurrence or the lack thereof of a momentary outage event is determined.

At 350, the AMR-SCADA sensor voltage status data is evaluated for data quality issues and where desired the voltage readings are transformed to ensure that the incoming data is usable and maintainable for further analysis. At 360, the voltage status at the device level is compared with historic data to analyze discrepancies or outliers and an effort is made to identify the root-cause of the deviation.

At 370, the AMR-SCADA sensor current readings are transformed to derive data that can lead at 340 to determining the occurrence or the lack thereof of a momentary outage event. At 380, the AMR/SCADA sensor current data is received and evaluated for data quality issues and where desired the current readings are transformed and at 380 compared with historic data to analyze discrepancies or outliers and an effort can be made to identify the root-cause of the deviation. At 390, the current average readings are calculated for pre-defined intervals to maintain consistency across the years that the data was collected for the device.

At 340, the data from 330, 360 and 390 is received and inferences that determine the occurrence of an outage event are recorded at the device level with exact date and time information.

Voltage Fluctuation Capture & Attribution to Circuits, Devices, and Customers (See FIG. 4)

FIG. 4 shows a process 400 for attributing a voltage fluctuation, power quality issue, power banding, etc., to the right circuit, device and customer that is impacted, according to an embodiment. At 410, AMR-SCADA voltage and phase values are recorded based on data received from SCADA devices.

In at least some instances, a voltage fluctuation (e.g., a voltage anomaly) can be associated with an outage event. For example, a momentary outage can be caused by a protective device that can be configured to sense unusual and/or unsafe power delivery characteristics within an electrical grid. These protective devices can operate to prevent circuit and equipment damage, customer equipment damage, outage cascade (e.g., an outage that can cause grid instability and outage growth across the electrical grid as other protective devices react to the unstable grid situation), and/or to enhance safety, such as when active wires touch the ground or structures. In at least some instances, these outages can begin with an increased fault current that can indicate that a circuit has a low resistance path to ground and can facilitate unrestricted current flow. In some instances, a fault current can be accompanied by an undervoltage and underfrequency condition. In other instances, a fault current can be unaccompanied by an undervoltage and underfrequency condition, and a protective device triggering criteria can be based on the level and duration of the fault current flow. The protective device can operate by opening a switch that disconnects the load side of the circuit (e.g., an electrical grid portion) having the fault current from the rest of the circuit. Some protective schemes can further measure overvoltage as an indication of a voltage surge to initiate outage operations. A voltage surge can be caused by, for example, lightning strikes that are not adequately handled by existing lightening arrestors and/or by distributed generation equipment located on the circuit that has lost voltage regulating capability. Likewise, an undervoltage can be caused by sudden load increases on the circuit that can damage already operating machinery. At least one of overvoltage, undervoltage, and/or current limits can be accounted for in a protection zone design for each protective device based on, for example, that protective device's location within the electrical grid.

In some instances, a voltage fluctuation can be identified based on voltage banding. Voltage banding includes details about each voltage event that has crossed a predefined voltage threshold value(s) such as a predefined undervoltage (also referred to herein as under voltage) threshold value or a predefined overvoltage (also referred to herein as over voltage) threshold value, and the records that are involved in each voltage event and the maximum threshold value observed for the voltage event. The conditions to classify a voltage event are outlined below.

At 420, if the voltage falls below the "Under Voltage Threshold" value but above the "Outage Threshold Value", a voltage event starts and continues until the voltage crosses above the "Under Voltage Threshold" value. If the voltage crosses "Over Voltage Threshold" value, a voltage event starts and continues until the voltage falls below "Under Voltage Threshold" Value. All the voltage recordings between an event start and an event end will form a voltage event. The voltage banding procedure loads outage data, which captures drops and rises in voltage values. The voltage before the drop, the voltage at the drop, and the voltage after the rise is captured. The corresponding time-stamps. SCADA devices and phase lines as the outage occurred are also captured. The drop in the voltage value for each row in the table is compared against the average value. If the dip is greater than threshold value (e.g., 90%) as specified in the parameter table in 1022, then it qualifies as an outage. The procedure skips all the subsequent values until the voltage rises back to the average voltage value for a particular SCADA device.

At 430, the voltage drops (detected at 420) are correlated to the device that recorded the readings, and the position of that device relative to the circuit. This determination helps to identify the customers that are upstream and downstream to that device and this relative position(s) to that device is used to calculate the number of customers impacted due to the voltage event. Additional attributes are also captured such as geography data (e.g., latitude, longitude, etc.) circuit, source system, town and/or structure number.

At 440, the voltage fluctuation is calculated as a percentage drop from the pre-defined voltage thresholds as explained in the next paragraph along with number of customers impacted by the voltage event. These two determinations are used to calculate the Momentary Average Interruption Frequency Index (MAIFI).

Figure 5:
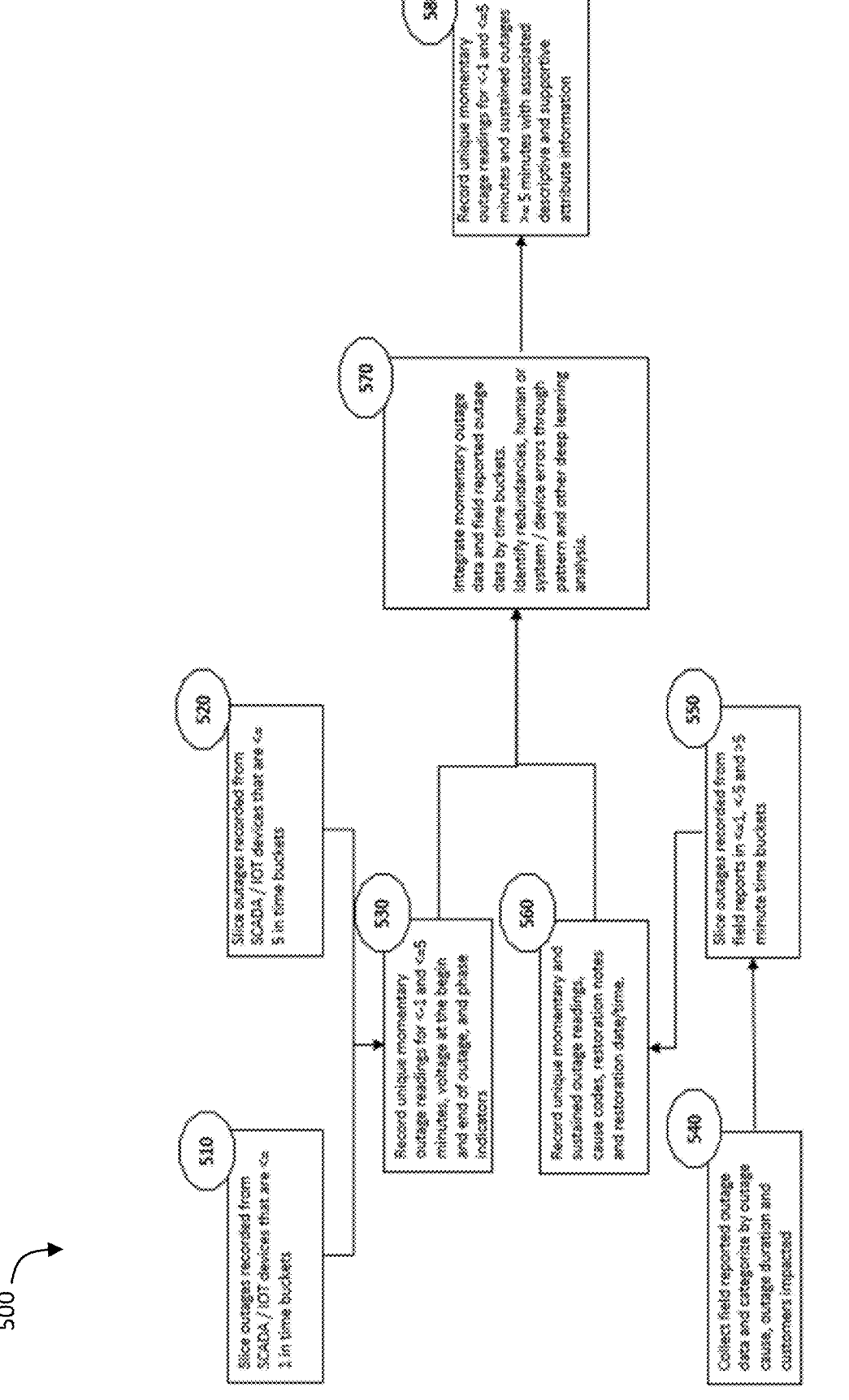
FIG. 5 is a flowchart of the process to intelligently integrate SCADA channel readings with field-reported outage data, according to an embodiment.

Intelligent Integration of SCADA Channel Readings w/Field Reporting Outages (See FIG. 5)

FIG. 5 shows a process 500 for integrating the data gathered from the SCADA devices with the field reported outage data, according to an embodiment.

At 510, the momentary outage events that are recorded as lasting less than one minute from step 440 in FIG. 4 are sliced in time intervals, also known as time buckets, to enable further analysis.

At 520, the momentary outage events that are recorded as lasting equal to or less than 5 minutes from step 440 in FIG. 4 are sliced in time intervals, also known as time buckets, to enable further analysis.

At 530, the momentary outage events are classified in two buckets, one those lasting less than one minute and the other lasting between one and five minutes, along with voltage readings captured at the begin and end of the outage event with the phase indictor information.

At 550, the field reported outage data, also known as sustained outage data, is collected along with the outage cause (the reason code that was determined by the technician gathering the field data), outage duration (the start and end time of the outage event) and the number of customers that were impacted due to the outage event. This field reported outage event data is sliced into three buckets based on the duration of the outage event as follows: outage events that lasted 1 minute or less, outage event greater than 1 and <=5 minutes, and outage events that lasted more than five minutes.

At 560, the field reported outage data is categorized as momentary outage (if 1 minute or less and greater than 1 and <=5 minutes) and sustained (if it lasted more than five minutes) along with additional attributes like cause codes, restoration notes gathered by the technician/engineer, and the restoration data and time.

At 570, the momentary and sustained outage event data from 530 and 560 is integrated and maintained by outage type (momentary or sustained). The outage event data is analyzed for redundancies. For example, an outage event recorded by the SCADA enabled device may have also been gathered as field reported outage.

At 580, unique momentary outage readings that last less than one minute and between one and five minutes are associated with unique sustained outages that last more than five minutes with supporting attributes like outage start time, outage end time, voltage at the start of the outage, voltage at the end of the outage, phase, restoration remarks, restoration date and time, cause of the sustained outage, etc. This data is used to determine the number of outages each customer experienced by device per year. The device key and the date-time of the outage is used to uniquely identify an outage on a device. Every customer that experiences an outage by a device per year is captured. The total number of outages per device per year is thus calculated. These attributes help with calculating the metric Customers Experiencing Long Interruption Duration, or CELID. (CELID calculates the number of customers that have experienced long duration electric service interruptions in the past timeframe, typically 12 months, and typically with durations>=6 hours.)

Weather Station Identification and Correlation (See FIG. 6)

FIG. 6 is a flowchart showing a process 600 by which weather stations in closest proximity to a device are identified and a correlation of weather attributes to outages follows, according to an embodiment. The process 600 of FIG. 6 can be performed, for example, at weather service server (1014) and/or ETL (1020) (shown in FIG. 10). As shown in FIG. 6, at 610, data is received from each weather station coupled to the system. The data can include, for example, location information, weather information and operational status of the respective weather station. At 620, the closest weather station to the electrical grid device or device is determined, for example, by comparing the location of each weather station to the location of the electrical grid device or device. At 630, errors in the weather data, if any, are identified. For example, if the weather information is out of a predefined range of possible values (e.g., temperature above 200 degrees Fahrenheit), then that respective weather station is identified as providing erroneous weather data. If errors are identified at 630, then at 640, the next closest weather station to the electrical grid device or device is determined. At 650, weather attributes are correlated to outage information. For example, the weather information from the relevant weather station can be compared to outage information stored at the outage management system reporting server (1010).

Outage Information Enrichment (See FIG. 7)

FIG. 7 shows a flowchart for a process 700 that is configured to use image analysis and smart inspection data with outage event recordings to, for example, predict a causation(s) of an outage event, as part of an embodiment.

At 710, data from smart inspection process is received and at 720 analyzed for data issues. At 730, a process is executed to identify errors in the smart inspection data and at 740 the accuracy of the device image analysis is determined.

Figure 10:
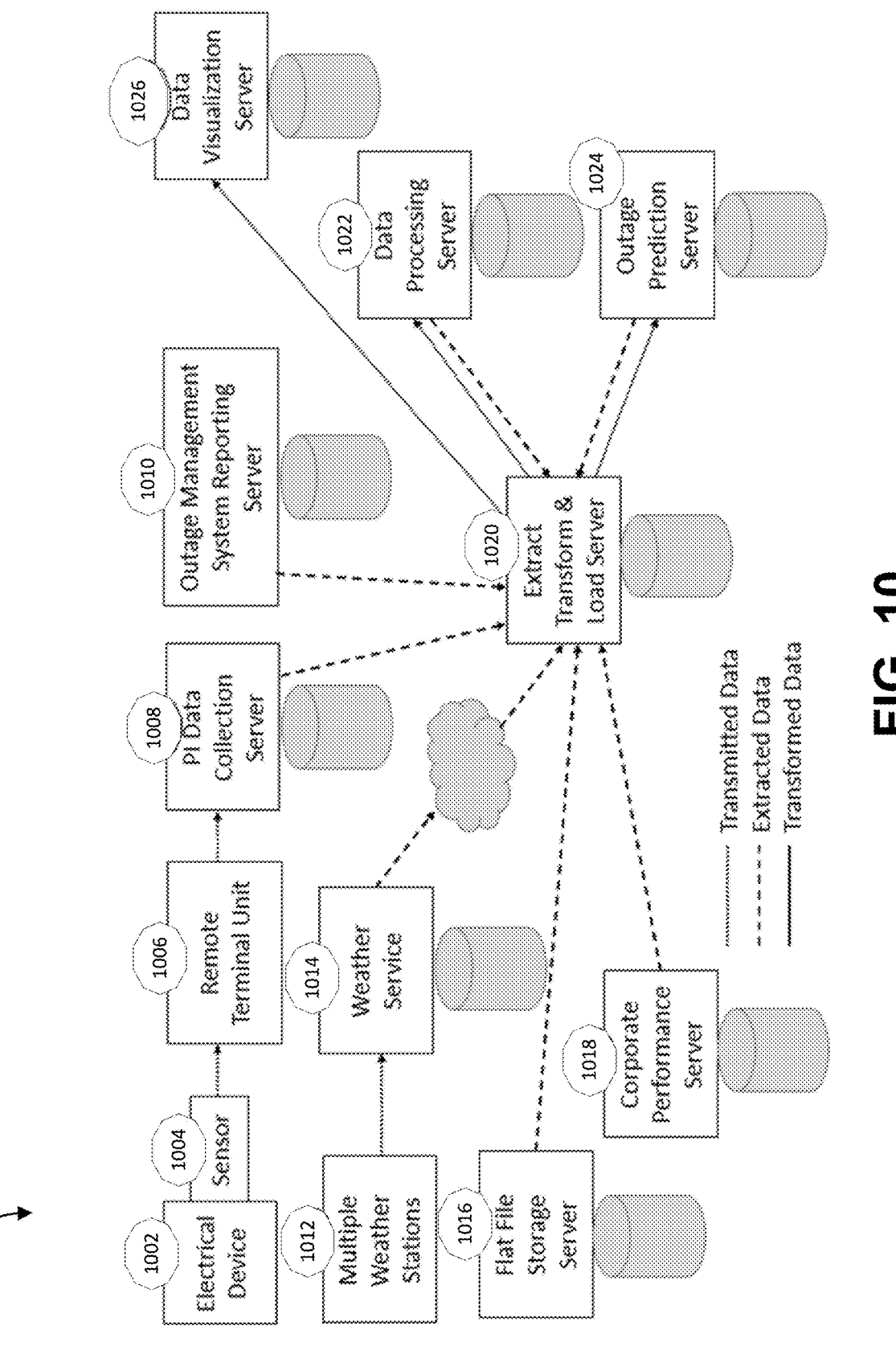
FIG. 10 is a system block diagram of an outage prediction system, according to an embodiment.

The image data is used to supplement the outage data that was derived as explained in preceding paragraph. For example, the image data can be provided as input to a machine learning model (e.g., a convolutional neural network (CNN)) to predict a lean angle of a utility pole (e.g., a tilt of the utility pole relative to a vertical axis). The predicted lean angle can be used in the data processing server 1022 and outage prediction server 1024 (as shown in FIG. 10) to predict the possibility of outages on a device that is mounted on that utility pole or on a circuit attached to that particular utility pole.

Figure 8:
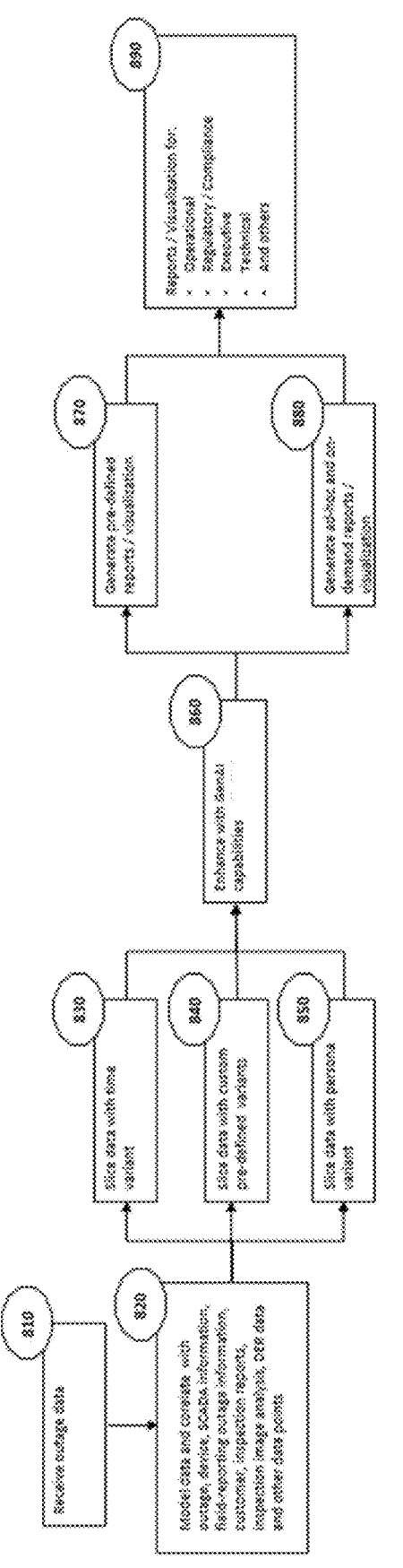
FIG. 8 is a flowchart of the reporting and visualization engine with generative artificial intelligence integration, according to an embodiment.

Reporting/Visualization Engine with Generative Machine Learning Integration (See FIG. 8)

Within a process 800, as depicted in FIG. 8, outage information is displayed in multiple views, including for example geography, circuits & devices, customers, time, and poor performing circuits. More specifically, at 810, the outage data is received in the data processing server 1022. At 820, the outage data is correlated with devices and customers (as discussed above in connection with 420 and 430), inspection reports, inspection image analysis (as discussed in the prior paragraph), Distributed Energy Resources, or DER data, and other data points.

The data is organized at the appropriate granularity and sliced in time variant at 830, custom pre-defined variant in 840 and persona variant in 850, thereby providing the ability to look at data from multiple perspectives and supporting multiple personas-classes of users who have specific business and operational needs such as engineers, customer account executives, and electric operations leadership and executives.

At 860, the data is processed (e.g., at the data visualization server 1026 shown in FIG. 10) and enhanced using a generative machine learning model(s) to generate pre-defined reports and visualizations at 870 and ad-hoc/on-demand reports and visualizations at 880. At 890, the data is processed in form of reports and visualization and this enables the user to interact with the data in natural language format and also view predefined reports and visualization.

Integration of data (e.g., data related to geography, circuits, devices, customers, weather, etc.) from multiple systems (e.g., including the electrical grid, weather stations, etc.) in a visual representation provides an integral view of the electrical network (electrical grid), captures field-reported outages, identifies momentary outages from sensored devices (e.g., SCADA-enabled devices with sensors), organizes data sliced in time variants at the appropriate level of granularity, and eliminates the requirement for users to interact with the multiple systems, providing system-wide outlooks on electrical network reliability and outage trends. It allows for the acceleration of investigations into customer complaints, based on visualizations of outages across the electrical grid with the ability to focus on, for example, circuits, devices, time, customers, and geography.

Figure 9:
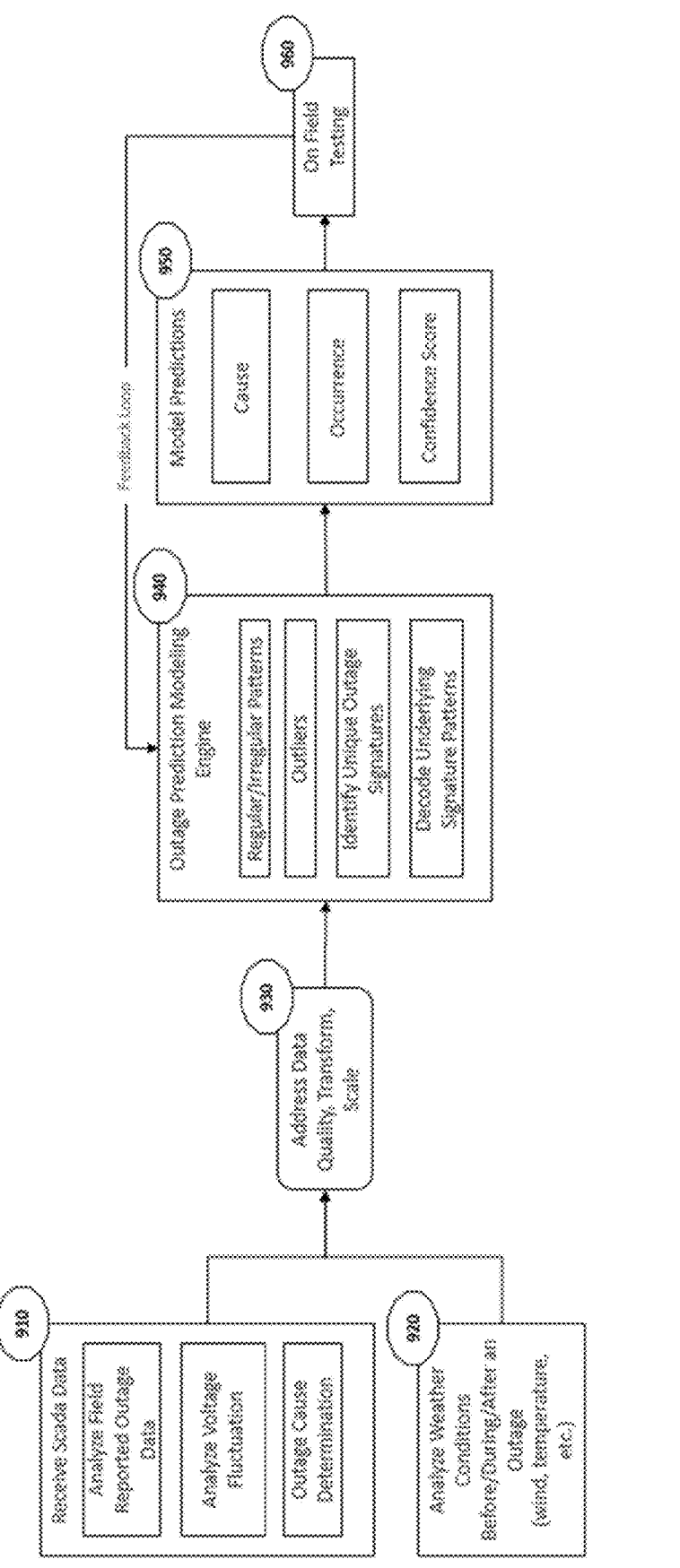
FIG. 9 is a schematic diagram of the sustained outage prediction engine with artificial intelligence and machine learning, according to an embodiment.

Sustained Outage Predictions (See FIG. 9)

A multi-model process 900 analyzes momentary outages captured by the PI and OUA source systems and predicts possible sustained outages, which can be executed by the outage prediction server (e.g., by an outage prediction server 1024 shown in FIG. 10, described herein), according to an embodiment.

At 910, the momentary outages captured daily by the source systems are fed to the outage prediction engine and are analyzed for voltage fluctuations and outage cause.

At 920, several attributes tagged to outages (e.g., weather such as wind and precipitation type, as indicated by weather data, precipitation data, etc.), location (e.g., latitude, longitude, and/or other geographic data), and the cause(s) of the momentary outage occurrence are analyzed and processed at a data processing server (e.g., at data processing server 1022 shown in FIG. 10). For example: rain with snow and wind gusts of 50 mph caused a voltage drop at a device due to tree branch.

At 930, data quality issues are mitigated and the data is transformed and scaled to enable further analysis.

At 940, momentary outages are analyzed for pattern recognition and outlier recognition. For example: an outage can be caused by pending equipment failures such as broken insulators or bad splices or insulation failures. Each of these failures can often be preceded by momentary outages as the equipment progresses towards total failure without remedy. By analyzing circuit behavior and patterns of momentary outages, managers can dispatch crews to inspect the line and find these pending failures before they have a chance to progress to full circuit failures.

At 940, the momentary outages are also grouped by probable cause codes (e.g., the momentary outages can be associated with probable causes, probable cause codes or probable cause types). This grouping strategy aids in the identification of unique outage signatures in the data set (e.g., the sensor data) and decode the underlying signature patterns. The probable cause types (e.g., Vegetation, TREV—Vines, TREE—Tree/Limb Outside, Trim Zone/Unknown, TREI—Tree/Limb on the Line Within Trim Zone, Equipment Failure, EQUP—Equip Failure, LOXS—Loss of External Power Supply, OVLD—Overload, CAPH—Cable TV Wire or Phone Cable, Undetermined, MISC—Miscellaneous, ANIM—Animal/Birds, PTNF—Patrolled Nothing Found, ACBO—Action by Others, VAND—Vandalism, NSEL—Not Selected, EMPL—Employee Error, CNTR—Contractor Error, PRIV—Customer Equipment, SNIC—Snow/Ice Loading) can be further grouped into (associated with), for example, four categories as shown below to provide an understanding of the underlying factors:

Category 0: Vegetation.
Category 1: Equipment Failure.
Category 2: Undetermined.
Category 3: SNIC-Snow/Ice Loading.

At 950, the outage prediction modelling engine predicts the probable cause of a possible sustained outage, based on the analysis and the initial classification model at 940. The probable causes may include factors such as vegetation, equipment failure, etc. The outage prediction modelling engine can include a machine learning model that can be trained to predict the vegetation probable cause based on (1) training data that includes observed and/or synthesized vegetation data (e.g., a measure of vegetation type, growth amount, etc.) and (2) ground truth data that includes observed and/or synthesized outage data (e.g., sustained outage data).

At 950, the outage prediction model also predicts the likelihood of an outage becoming sustained along with a confidence score.

The likelihood of an occurrence (e.g., an outage becoming sustained) is categorized in the following timeframes: 1 to 30 days, 31 to 90 days, and over 3 months. By leveraging a power grid device, the time between outages is computed. This involves subtracting the date-time values of a momentary outage from a sustained outage, resulting in a precise floating-point value that represents the duration in days, and incorporates the precise measurement of hours, minutes, and seconds.

The confidence score is calculated using a regression model (or other stochastic model, such as a neural network or other machine learning model) for the outages forecasted to become sustained within 1 to 30 days. This confidence score is based on the temporal proximity of events and leverages the regression model specifically designed to calculate a confidence score for outages forecasted to transition from momentary to sustained within a timeframe of 1 to 30 days. This regression model aims to predict the number of days until a momentary outage transforms into a sustained outage. The confidence score exhibits a direct relationship with the proximity of the event, where the confidence score increases as a momentary outage approaches the transition

15 point and decreases as the number of transitioning days increases. Regression models typically align their predictions with theoretical quantiles. To convert the predicted number of days into a corresponding confidence score value, a linear relationship between these two values can be established. This linear relationship can be represented using the equation of a line: y=mx+b. In the equation provided, 'm' represents the slope of the line, while 'b' denotes the y intercept. To determine the values of 'm' and 'b', a timeframe of 1 day corresponds to a confidence score of 100%, and a timeframe of 30 days corresponds to a confidence score of 65%.

$$m = \frac{percentage2 - percentage1}{dayValue2 - dayValue1} = \frac{65 - 100}{30 - 1} = -\frac{35}{29}$$

To determine the 'y' intercept (b), the given values of one point are substituted into the equation. By choosing a specific data point, the y intercept can be calculated, which helps in defining the starting point of the line.

$$y - mx + b \rightarrow 100 = -\frac{35}{29}(1) + b \rightarrow b = 100 + \frac{35}{29}|$$

By substituting and simplifying the values into the equation of the line the following formula is obtained:

Confidence Score =

$$\frac{predicted\ days\ until\ sustained\ outage - 1}{30 - 1} \times (65 - 100) + 100$$

Confidence scores can be displayed to a user(s) (e.g., a distribution engineer(s)) at a predefined frequency (e.g., on a weekly basis) and/or in response to the outage prediction system generating a sustained outage prediction. In some implementations, the outage prediction system can cause confidence scores that are above a predefined threshold to be displayed (and can exclude confidence scores that are below the predefined threshold from being displayed). As a result, confidence scores associated with predictions that warrant remedial action can be displayed, while confidence scores that do not warrant a remedial action (e.g., due to high uncertainty) can be prevented from being displayed. The user(s) can leverage the confidence scores while reviewing the prediction and dispatch personnel (e.g., "field workers") to, for example, perform a "field patrol" at an associated location of the electrical grid. The field patrol can include a feedback mechanism that validates whether the prediction was accurate or not. In response to validating the prediction, field workers can create a work order to perform remedial actions, such as trimming overgrown vegetation, replacing and/or repairing assets, etc. As a result of this process, a high probability outage can be prevented.

The sustained outage prediction model can include a machine learning model executed via a compute device that is functionally and/or structurally similar to the outage prediction server 1024 of FIG. 10 (described herein). In some implementations, the sustained outage prediction model can include at least one tree ensemble (e.g., a plurality of decision trees). Within each decision tree, each internal node of that decision tree can represent a decision point based on an attribute, each branch can represent an outcome

16 of that decision, and each leaf node can be associated with a predicted class label, which can include a decision after evaluation of relevant attributes. The sequence of decisions from the root to a leaf can define a set of rules for classification.

Ensemble learning can enhance a prediction process by building numerous decision trees during a training phase. Instead of relying on a single tree, a tree ensemble can aggregate the predictions from a plurality of trees to determine the final output. For classification tasks, this aggregation is typically the mode (e.g., the most common class among the trees' predictions). For regression tasks, the aggregation can be an average of the trees' prediction.

The sustained outage prediction model can receive as input data from various sources to identify and characterize momentary and sustained outages. To improve predictive accuracy and/or computational efficiency of the training process, data preprocessing techniques can be performed on the data from the various sources. Such data preprocessing techniques can include, for example, dimensionality reduction and/or complexity reduction of the data, data cleansing, data integration, data transformation, etc.

In some instances, a statistical test(s) can be conducted to identify predictors within a feature space. A statistical test can include, for example, a Chi-Squared test, a mutual information test, an F-regression test, recursive feature elimination (RFE), etc. Once a desired feature set is established, Bayesian optimization can be used to optimize model performance and achieve a balance between bias and variance.

In response to detecting a sustained outage event and/or determining that a momentary outage event has no less than a predefined probability of becoming a sustained outage event, at least some systems and methods described herein can be configured to cause a remedial action to be performed on the electrical grid to mitigate the sustained outage (or possibility of a sustained outage). In some instances, a remedial action can be selected from a plurality of remedial actions based on, for example, the number and/or type(s) of electrical customer(s) (e.g., as indicated by an identity signal associated with impacted electrical customers). For high priority customers, such as police, fire, hospital medical priority customers, etc., a remedial action can include for example priority patrolling and corrective actions, circuit reconfiguration to minimize outage impact, interactions with customers (e.g., via automated messaging) to activate power reliability contingencies, and/or demand reduction (e.g., by automatically disconnecting customer loads (e.g., lower priority customer loads) from the grid) to lessen the stress on the electrical grid.

Examples of circuit reconfiguration include, for example, causing a switchover (e.g., by triggering a switch) to an alternative (e.g., backup) feeder coupled to an alternative power source and/or transmission path, causing (e.g., via a contactor) a distributed energy source, such as a battery, to be electrically coupled to the electrical grid, causing (e.g., via a contactor) a capacitor bank to be electrically coupled to the electrical grid, etc. In some implementations, the outage prediction system can be configured to respond to an overvoltage and/or undervoltage system. For example, to regulate voltage, the outage prediction system can be configured to cause a change in resistance (e.g., via a resistor, capacitor, inductor, and/or the like). When a sustained outage is predicted, patrol crews can be dispatched (e.g., based on an automatically generated alert signal) to the circuit to look for circuit problems, assess vegetation encroachment, and/or correct circuit deficiencies.

Embodiment Hardware and Architecture

Figure 11:
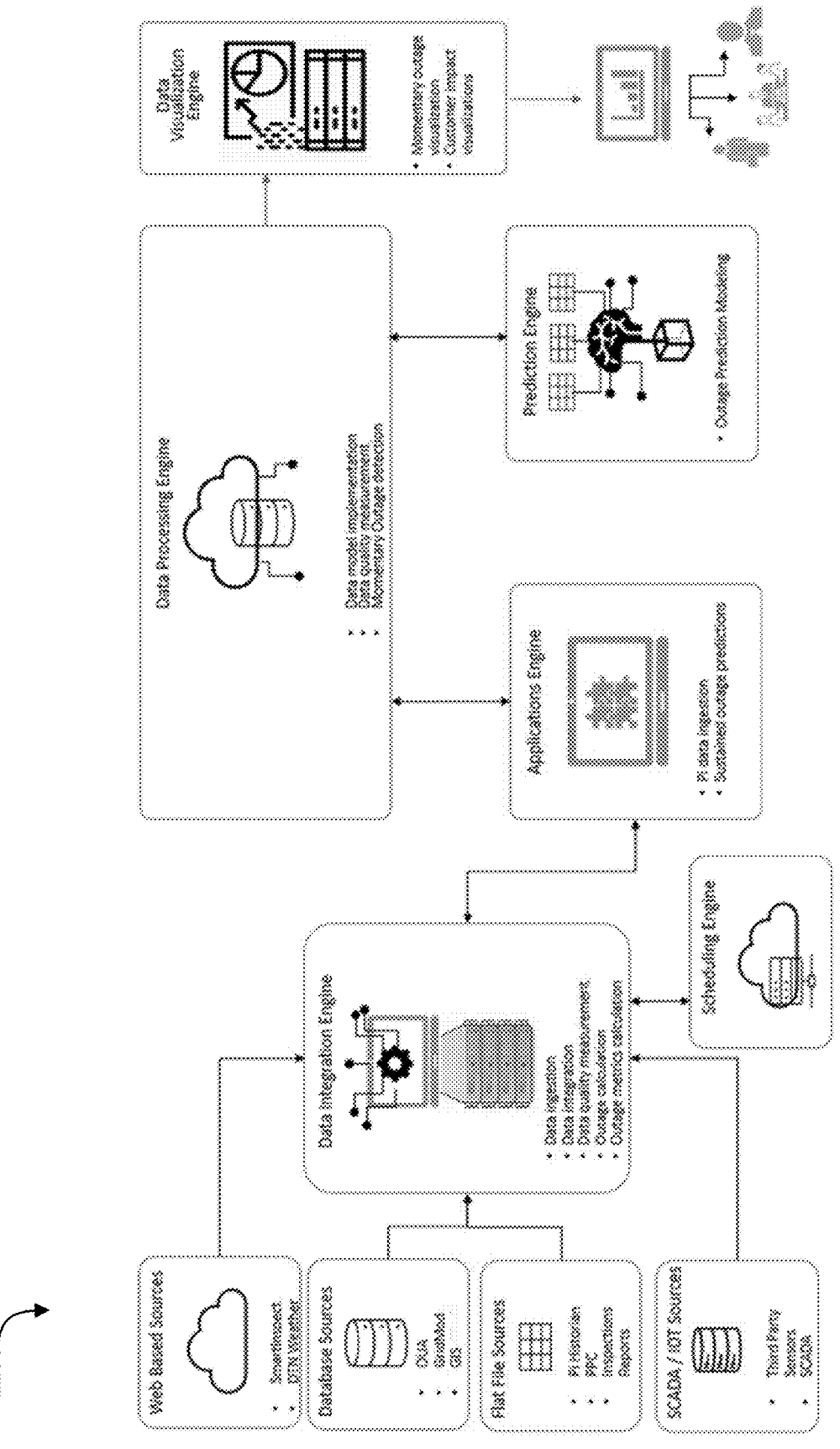
FIG. 11 is a schematic diagram showing the data sources and the processing engines for the outage prediction system shown in FIG. 10.

Momentary outages on circuit segments can be detected by measuring voltage variations of circuit assets including (e.g., coupled to) SCADA sensor devices as shown in FIGS. 10 and 11, according to an embodiment. By looking for large scale variations in voltage readings and correlating these variations with current sensor fluctuations on these same assets, the embodiment identifies signatures consistent with momentary power delivery interruptions.

For example, as shown in the hardware diagram FIG. 10, an outage prediction system 1000 includes an electrical device 1002 disposed at the distribution electrical network. The electrical device 1002 has a sensor 1004 that transmits voltage, current, status, and/or other readings to a remote terminal unit 1006 to collect readings and send them to a PI data collection server 1008.

A data processing server 1022 calculates and identifies momentary outages and associates them with the corresponding asset, circuit, and customers, and correlates them to sustained outages. Indications of sustained outages are received from the outage management system reporting server 1010 via extract, transform and load server (ETL) 1020.

The ETL server 1020 extracts and transforms PI readings from the PI data collection server 1008, weather data from the weather service 1014, flat files from the flat file storage server 1016, corporate metrics from the corporate performance server 1018, sustained outage, asset, circuit, organization and customer data from the outage management system reporting server 1010, and loads this data in the data processing server 1022 in a form suitable for the calculation of momentary outages.

Data processing server 1022 calculates momentary average interruption frequency index (MAIFI) by maintaining a history of all momentary outages within the utility's distribution network. Data processing server 1022 also maintains attributes of the outage such as the number of customers affected by the outage, outage duration and circuit and outage details needed to calculate MAIFI. Data processing server 1022 stores the information used to calculate MAIFI to regulatory standards. A corporate performance server 1018 provides corporate metrics that are incorporated into the embodiment.

This embodiment provides a unified view of momentary and sustained outages. By recording consistent outage start times for all outages, the embodiment correlates sensor-identified outages against sustained outage start times. This process is enabled by the outage management system reporting server 1010, which includes sustained outage data provided by the outage management system (not shown), asset, circuit, and organization information from a GIS system (not shown) and customer information from the CIS system (not shown).

This embodiment executes algorithms that use asset location on a circuit, outage start time, outage information reported by other assets on a circuit and additional circuit information to identify and classify an outage. The embodiment consolidates all outage information gathered by multiple assets on a circuit into a single outage, removing outage duplication and identifying the scope of the outage and number of customers affected by an outage, even when reported at multiple points on a circuit.

This embodiment provides comprehensive analytic views across circuits, devices, time, customers, and geography. The embodiment gathers extensive information about the utility's electric grid and its associated customer base. The embodiment also gathers and integrates data from several associated subsystems such as customer data, operational management system (OMS) data, GIS, corporate performance management, Grid modernization, SCADA sensor measurement systems, and weather data—as seen in the FIG. 10 where multiple weather stations 1012 transmit periodic weather readings to a weather service 1014 (also referred to herein as a weather service server), which provides an interface to pull weather data.

This embodiment integrates this data into a series of analytic views and capabilities that consolidate capabilities from more than a dozen disparate legacy tools and applications into a single tool. FIG. 10 shows a data visualization server 1026 that provides visualization graphs based on the data created in the data processing server 1022 and the outage prediction server 1024. The ETL server 1020 extracts and transforms momentary and sustained outage data, asset, circuit, customers, and organizational data, corporate metrics, flat file data, weather data, and PI sensor data from the data processing server 1022 to the data visualization server 1026.

This embodiment incorporates data from the field operation teams that inspect assets, capture pictures, and enter visual observations and measurements. A flat file storage server 1016 includes inspection report and other data.

The data derived from the algorithmic and AI analysis of images is leveraged as additional inspection attributes alongside notes and measurements. This data set, in addition to the SCADA sensor data, field-reported outages from the operational management system (OMS), and weather recordings at the time of an outage event, is tested for data issues, minimizing image analysis errors and data issues, and is transformed where necessary to enrich the outage data.

While this embodiment identifies momentary outages for an advanced meter reader (AMR)-metered customer base, it can be efficiently enhanced to include advanced metering infrastructure (AMI)-metered customer base.

Figure 12:
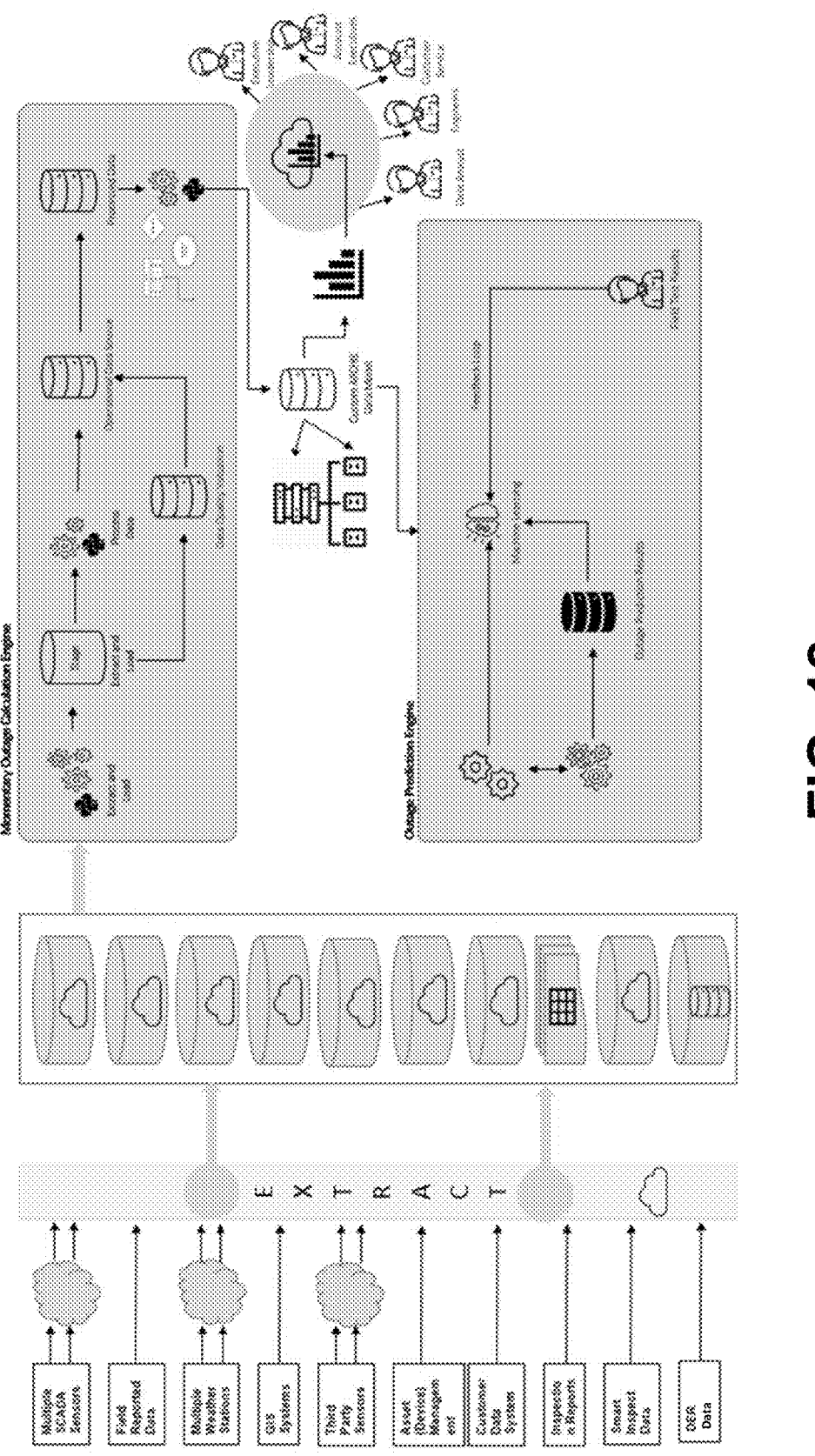
FIG. 12 is a schematic diagram of the data sources and data processing system structures for the outage prediction system of FIG. 10.

FIGS. 11 and 12 show, respectively, outage prediction systems 1100 and 1200 that each can be configured to analyze data from a plurality of sources to predict outage events, predict outage causes, determine outage confidence scores, etc. For example, as shown in FIG. 11, the outage prediction system 1100 can be configured to receive, for example, weather data, etc., from web-based sources: Oracle® Utilities Analytics (OUA) data, geographic information system (GIS) data, etc., from database sources: PI historical data, inspection reports, power plant controller (PPC) data, etc., from flat file sources: SCADA and/or sensor data from SCADA and/or IoT devices; and/or the like. As shown in FIG. 12, the outage prediction can receive, for example, data from a plurality of SCADA sensors, field reported data, weather from a plurality of weather stations, GIS data, third part (e.g., IoT) sensor data, asset (e.g., device) management data, customer data (e.g., that is associated with a customer data system), inspection reports, smart inspection data, distributed energy resource (DER) data, etc.

Customer data can include an indication of customer type (e.g., residential, industrial, business etc.), a customer criticality rating (e.g., a metric that rates a hospital, police station, etc., higher than a restaurant, retail store, etc.), a customer address, weather data associated with the customer location, customer outage history, customer neighborhood outage history, an indication of assets associated with a customer circuit and involved in prior outages, presence or lack of distributed energy resources (DER) (e.g., solar, battery banks, etc.), and/or the like. At least some outage prediction systems described herein can receive customer data as input to correlate historical events and predict a cause (e.g., device fault, vegetation, etc.) that can lead to a sustained outage. The outage prediction systems 1100 and/or 1200 can be functionally and/or structurally similar to the outage prediction system 1000 of FIG. 10.

The outage prediction systems 1100 and/or 1200 can be functionally and/or structurally similar to the outage prediction system 1000 of FIG. 10.

Any of the processes, methods, algorithms, engines and/or models described herein can be embodied as software (or code or instructions) and stored within a storage device(s) (e.g., the memories within various servers described in connection with FIGS. 10, 11 and 12) and executed by a processor(s) (e.g., the processors within the various servers described in connection with FIGS. 10, 11 and 12).

Figure 13:
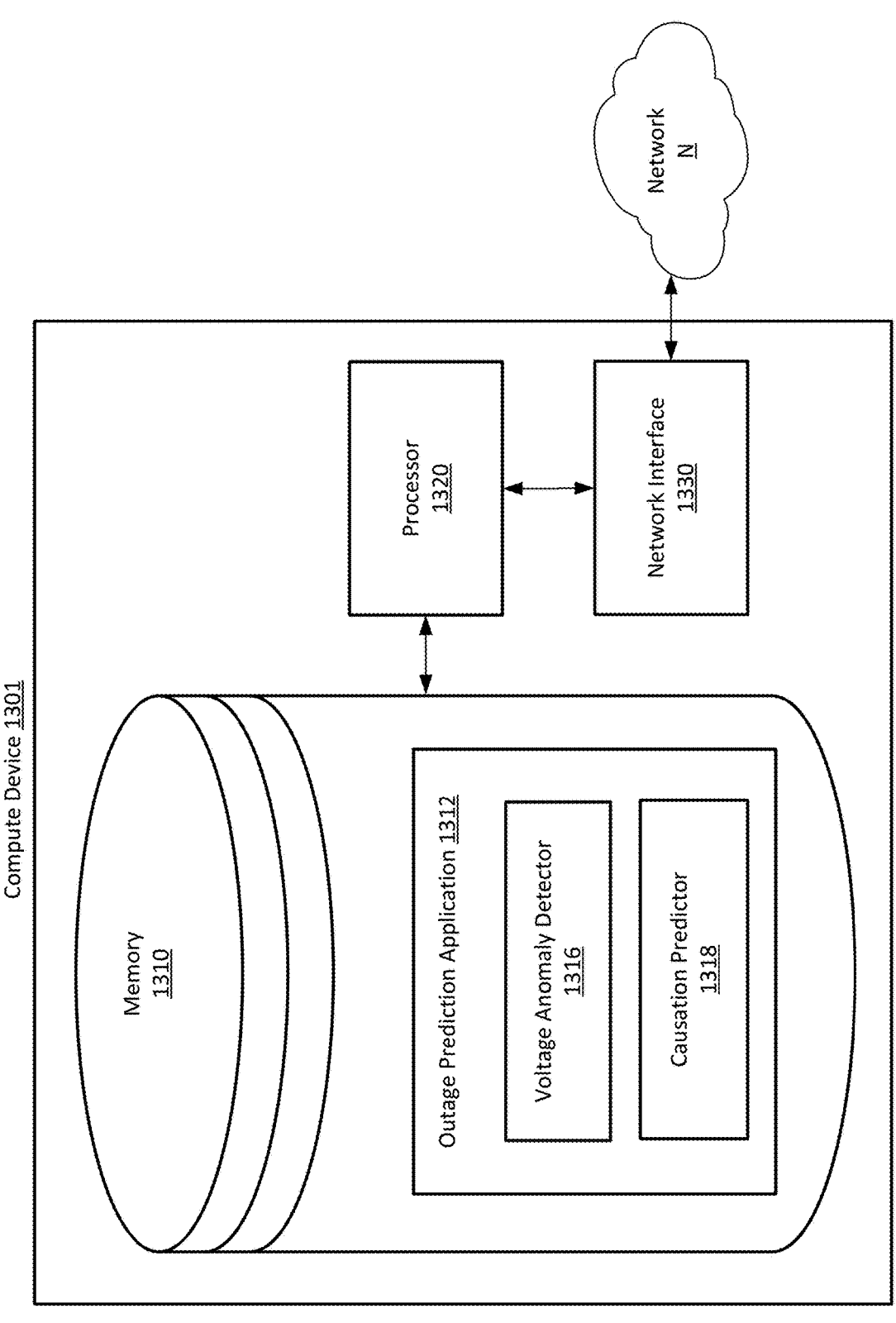
FIG. 13 shows a schematic diagram of a compute device included in an outage prediction system, according to an embodiment.

FIG. 13 shows a schematic diagram of a compute device 1301 included in an outage prediction system, according to an embodiment. The compute device 1301 can be structurally and/or functionally similar to, for example, at least one of the servers 1008-1026 of the outage prediction system 1000 shown in FIG. 10. The compute device 1301 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 1301 includes a memory 1310, a processor 1320, and a network interface 1330 operably coupled to a network N.

The processor 1320 can be, for example, a hardware-based integrated circuit (IC), or any other suitable processing device configured to run and/or execute a set of instructions or code (e.g., stored in memory 1310). For example, the processor 1320 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 1320 is operatively coupled to the memory 1310. In some embodiments, for example, the processor 1320 can be coupled to the memory 1310 through a system bus (for example, address bus, data bus and/or control bus). In some implementations, the processor 1320 can include a plurality of parallelly arranged processors.

The memory 1310 can be, for example, a random-access memory (RAM), a memory buffer, a hard drive, a read-only memory (ROM), an erasable programmable read-only memory (EPROM), and/or the like. The memory 1310 can store, for example, one or more software modules and/or code that can include instructions to cause the processor 1320 to perform one or more processes, functions, and/or the like. In some implementations, the memory 1310 can be a portable memory (e.g., a flash drive, a portable hard disk, and/or the like) that can be operatively coupled to the processor 1320. In some instances, the memory can be remotely operatively coupled with the compute device 1301, for example, via the network interface 1330. For example, a remote database server can be operatively coupled to the compute device 1301.

The memory 1310 can store various instructions associated with processes, algorithms and/or data, as described herein. Memory 1310 can further include any non-transitory computer-readable storage medium for storing data and/or software that is executable by processor 1320, and/or any other medium which may be used to store information that may be accessed by processor 1320 to control the operation of the compute device 1301. For example, the memory 1310 can store data associated with an outage prediction application 1312. The outage prediction application 1312 can be executed by the outage prediction server 1024 to perform at least some of the functions (e.g., sustained outage likelihood prediction, sustained outage causation prediction, etc.) described at least in relation to FIG. 10.

The outage prediction application 1312 includes a voltage anomaly detector 1316 and a causation predictor 1318. The voltage anomaly detector 1316 can be configured to perform at least some of the functions (e.g., overvoltage detection, undervoltage detection, etc.) described at least in relation to FIG. 4. The causation predictor 318 can be configured to perform at least some of the functions (e.g., overvoltage detection, undervoltage detection, etc.) described at least in relation to FIGS. 6 and/or 7.

The network interface 1330 can be configured to connect to the network N, which can be functionally and/or structurally similar to the network (depicted by a cloud shape) shown in FIGS. 10 and/or 12. For example, at least some of the servers 1008-1026 can be networked and/or communicatively coupled to one another, via the network N, using wired connections and/or wireless connections. The network N can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some instances, the compute device 1301 can further include a display, an input device, and/or an output interface (not shown in FIG. 13). The display can be any display device (e.g., a monitor, screen, etc.) by which the compute device 1301 can output and/or display data (e.g., data generated by the data visualization server 1026 of FIG. 10). The input device can include a mouse, keyboard, touch screen, voice interface, and/or any other hand-held controller or device or interface via which a user may interact with the compute device 1301. The output interface can include a bus, port, and/or other interfaces by which the compute device 1301 may connect to and/or output data to other devices and/or peripherals.

FIG. 14 is a flowchart of a method 1400 implemented by an outage prediction system to predict sustained outage likelihoods, according to an embodiment. The method 1400 can be implemented by an outage prediction system similar to, for example, the outage prediction system(s) 1000 of FIG. 10, 1100 of FIG. 11, and/or 1200 of FIG. 12. Portions of the method 1400 can be implemented using a processor (e.g., the processor 1320 of FIG. 13) of any suitable compute device (e.g., the compute device 1301 of FIG. 13 and/or the servers 1008-1026 of FIG. 10).

The method 1400 at 1402 includes receiving sensor data measured by a plurality of SCADA-enabled sensors associated with an electrical grid and, at 1404, identifying a plurality of momentary outages associated with the electrical grid based on the sensor data. The method 1400 at 1406 includes predicting a plurality of possible sustained outages associated with the electrical grid based on the plurality of momentary outages and at 1408, predicting a sustained outage likelihood from a plurality of sustained outage likelihoods for each possible sustained outage from the plurality of possible sustained outages based on the plurality of momentary outages.

FIG. 15 is a flowchart of a method 1500 for predicting sustained outage events using an outage prediction system, according to an embodiment. The method 1500 can be implemented by an outage prediction system similar to, for example, the outage prediction system(s) 1000 of FIG. 10, 1100 of FIG. 11, and/or 1200 of FIG. 12. Portions of the method 1500 can be implemented using a processor (e.g., the processor 1320 of FIG. 13) of any suitable compute device (e.g., the compute device 1301 of FIG. 13 and/or the servers 1008-1026 of FIG. 10).

The method 1500 at 1502 includes receiving geographic data for a plurality of voltage sensors that are associated with an electrical grid and, at 1504, generating, based on the geographic data, dependency data that defines a plurality of dependencies between the plurality of voltage sensors. For each voltage sensor from the plurality of voltage sensors, at 1506, historical voltage measurements associated with that voltage sensor is received and compared to a predefined voltage threshold to produce momentary outage data associated with that voltage sensor. A machine learning model is trained at 1508 to predict a sustained outage event for a location within the electrical grid based on (1) the geographic data, (2) the dependency data, and (3) the momentary outage data, for each voltage sensor from the plurality of voltage sensors.

FIG. 16 is a flowchart of a method 1600 for identifying electrical consumers and facilitating remedial actions, according to an embodiment. The method 1600 can be implemented by an outage prediction system similar to, for example, the outage prediction system(s) 1000 of FIG. 10, 1100 of FIG. 11, and/or 1200 of FIG. 12. Portions of the method 1600 can be implemented using a processor (e.g., the processor 1320 of FIG. 13) of any suitable compute device (e.g., the compute device 1301 of FIG. 13 and/or the servers 1008-1026 of FIG. 10).

The method 1600 at 1602 includes receiving voltage data from a SCADA-enabled sensor that is associated with an electrical grid and, at 1604, detecting a plurality of momentary outage events based on the voltage data to produce momentary outage data. The momentary outage data is provided as input to a machine learning model at 1606 to predict a sustained outage event. In response to predicting the sustained outage event, at 1608, an electrical consumer is identified based on (1) geographic data associated with the SCADA-enabled sensor and (2) dependency data associated with a plurality of SCADA-enabled sensors that includes the SCADA-enabled sensor. A signal indicating a remedial action is sent at 1610 based on an identity of the electrical consumer.

According to an embodiment, a method includes receiving sensor data measured by a plurality of SCADA-enabled sensors associated with an electrical grid and identifying a plurality of momentary outages associated with the electrical grid based on the sensor data. The method further includes predicting a plurality of possible sustained outages associated with the electrical grid based on the plurality of momentary outages and predicting a sustained outage likelihood from a plurality of sustained outage likelihoods for each possible sustained outage from the plurality of possible sustained outages based on the plurality of momentary outages.

In some implementations, identifying the plurality of momentary outages includes identifying the plurality of momentary outages based on pattern recognition and outlier recognition within the sensor data. In some implementations, predicting the plurality of sustained outage likelihoods includes associating each momentary outage from the plurality of momentary outages with a probable cause from a plurality of probable causes. The predicting the plurality of sustained outage likelihoods also includes predicting, for each possible sustained outage from a plurality of possible sustained outages, a probable cause from the plurality of probable causes, the plurality of sustained outage likelihoods being calculated based on the plurality of probable causes. In some implementations, the method further includes predicting, for each momentary outage from the plurality of momentary outages, a number of days until that momentary outage transforms into a possible sustained outage from the plurality of possible sustained outages. The method also includes calculating, for each momentary outage from the plurality of momentary outages, a confidence score for that momentary outage based on the number of days for that momentary outage, the confidence score being proportional to the number of days.

In some implementations, the sensor data includes data from Advanced Metering Infrastructure (AMI). In some implementations, the sensor data includes data from Advanced Metering Infrastructure (AMI) sensors and data from Automatic Meter Reader (AMR) sensors. In some implementations, the method further includes sending a signal to cause a display of a user interface that shows an interactive visualization of at least some momentary outages from the plurality of momentary outages and at least one possible sustained outage from the plurality of possible sustained outages, the interactive visualization including a representation of at least one of circuits of the electrical grid, SCADA-enabled devices, changes over time within the electrical grid, customers of the electrical grid, or geography of the electrical grid.

According to an embodiment, a non-transitory, processor-readable medium stores instructions that, when executed by a processor, cause the processor to receive geographic data for a plurality of voltage sensors that are associated with an electrical grid and generate, based on the geographic data, dependency data that defines a plurality of dependencies between the plurality of voltage sensors. For each voltage sensor from the plurality of voltage sensors, historical voltage measurements associated with that voltage sensor is received and compared to a predefined voltage threshold to produce momentary outage data associated with that voltage sensor. A machine learning model is trained to predict a sustained outage event for a location within the electrical grid based on (1) the geographic data, (2) the dependency data, and (3) the momentary outage data, for each voltage sensor from the plurality of voltage sensors.

In some implementations, the machine learning model is a first machine learning model, and the non-transitory, processor-readable medium further stores instructions to cause the processor to train a second machine learning model to predict a start time associated with the sustained outage event based on the momentary outage data for each voltage sensor from the plurality of voltage sensors. In some implementations, the machine learning model is a first machine learning model, and the non-transitory, processor-readable medium further stores instructions to cause the processor to train a second machine learning model to predict a cause of the sustained outage event based on the geographic data and at least one of vegetation data, equipment reliability data, or precipitation data. In some implementations, the historical voltage measurements are associated with a phase from a plurality of phases, the instructions to cause the processor to train the machine learning model to predict the sustained outage event include instructions to cause the processor to train the machine learning model to predict the sustained outage event for the phase from the plurality of phases.

In some implementations, the predefined voltage threshold includes a predefined undervoltage threshold and a predefined overvoltage threshold, and the instructions to cause the processor to compare the historical voltage measurements to the predefined voltage threshold include instructions to cause the processor to, compare the historical voltage measurements to the predefined undervoltage threshold to produce undervoltage event data included in the momentary outage data. The instructions further cause the processor to compare the historical voltage measurements to the predefined overvoltage threshold to produce overvoltage event data included in the momentary outage data.

In some implementations, the instructions to cause the processor to compare the historical voltage measurements to the predefined voltage threshold include instructions to cause the processor to compare the historical voltage measurements to a predefined voltage threshold to produce outage data and compare the outage data to a duration threshold to produce the momentary outage data and sustained outage data. Additionally, the instructions to cause the processor to train the machine learning model to predict the sustained outage event include instructions to cause the processor to predict the sustained outage event using the sustained outage data as ground truth.

In some implementations, the non-transitory, processor-readable medium further stores instructions to cause the processor to receive field reported outage data and separate the field reported outage data based on a duration threshold to produce field reported momentary outage data and field reported sustained outage data, the machine learning model being trained based further on the field reported momentary outage data and the field reported sustained outage data.

According to an embodiment, a non-transitory, processor-readable medium stores instructions that, when executed by a processor, cause the processor to receive voltage data from a SCADA-enabled sensor that is associated with an electrical grid and detect a plurality of momentary outage events based on the voltage data to produce momentary outage data. The momentary outage data is provided as input to a machine learning model to predict a sustained outage event. In response to predicting the sustained outage event, an electrical consumer is identified based on (1) geographic data associated with the SCADA-enabled sensor and (2) dependency data associated with a plurality of SCADA-enabled sensors that includes the SCADA-enabled sensor. A signal indicating a remedial action is sent based on an identity of the electrical consumer.

In some implementations, the SCADA-enabled sensor is a first SCADA-enabled sensor, and the non-transitory, processor-readable medium further stores instructions to cause the processor to receive current data from a second SCADA-enabled sensor, the plurality of momentary outage events being detected based further on the current data, and the first SCADA-enabled sensor and the second SCADA-enabled sensor being associated with a line of the electrical grid. In some implementations, the machine learning model is a first machine learning model, and the non-transitory, processor-readable medium further stores instructions to cause the processor to receive an image that depicts infrastructure that is associated with the electrical grid and provide the image as input to a second machine learning model to detect an anomaly associated with the infrastructure. The instructions to cause the processor to provide the momentary outage data includes instructions to cause the processor to provide the momentary outage data and an indication of the anomaly as input to the first machine learning model to predict the sustained outage event.

In some implementations, the infrastructure includes a utility pole associated with the electrical grid, the anomaly includes a tilt of the utility pole relative to a vertical axis, and the second machine learning model is a convolutional neural network. In some implementations, the non-transitory, processor-readable medium further stores instructions to cause the processor to receive geographic location data associated with the SCADA-enabled sensor and identify a weather station based on the geographic location data. In response to identifying the weather station, weather data that is recorded at the weather station is received, the weather data being provided as further input to the machine learning model to predict the sustained outage event.

In some implementations, the machine learning model is a first machine learning model, and the non-transitory, processor-readable medium further stores instructions to cause the processor to provide the momentary outage data as input to a second machine learning model to predict a time duration between (1) at least one momentary outage event from the plurality of momentary outage events and (2) the sustained outage event.

Examples of computer code include, but are not limited to, micro-code or micro-instructions, machine instructions, such as produced by a compiler, code used to produce a web service, and files including higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale: in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B): in another embodiment, to B only (optionally including elements other than A): in yet another embodiment, to both A and B (optionally including other elements): etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either." "one of." "only one of," or "exactly one of." "Consisting essentially of," when used in the embodiments, shall have its ordinary meaning as used in the field of patent law.

As used herein in the specification and in the embodiments, the phrase "at least one." in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A): in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:
1. A method, comprising:
receiving sensor data measured by a plurality of SCADA-enabled sensors associated with an electrical grid;

identifying a plurality of momentary outages (1) associated with a component of the electrical grid, (2) having a duration that is less than a predefined duration, and (3) represented by the sensor data;

predicting, for each momentary outage from the plurality of momentary outages, a time period until that momentary outage transforms into a sustained outage that has a duration that is greater than the predefined duration, to produce a plurality of time periods;

identifying a plurality of possible sustained outages associated with the electrical grid based on the plurality of time periods being less than a predefined time period; and predicting a sustained outage likelihood from a plurality of sustained outage likelihoods for each possible sustained outage from the plurality of possible sustained outages based on the plurality of momentary outages.

2. The method of claim 1, wherein the component includes an interrupting device.

3. The method of claim 1, wherein predicting the plurality of sustained outage likelihoods includes:

associating the plurality of momentary outages with a plurality of probable causes; and predicting, for each possible sustained outage from the plurality of possible sustained outages, a probable cause from the plurality of probable causes, the plurality of sustained outage likelihoods being calculated based on the plurality of probable causes.

4. The method of claim 1, wherein:

each time period from the plurality of time periods represents a number of days until that momentary outage transforms into a possible sustained outage from the plurality of possible sustained outages.

5. The method of claim 1, wherein the sensor data includes data from Advanced Metering Infrastructure (AMI).

6. The method of claim 1, wherein the sensor data includes data from Advanced Metering Infrastructure (AMI) sensors and data from Automatic Meter Reader (AMR) sensors.

7. The method of claim 1, further comprising:

sending a signal to cause a display of a user interface that shows an interactive visualization of at least some momentary outages from the plurality of momentary outages and at least one possible sustained outage from the plurality of possible sustained outages, the interactive visualization including a representation of at least one of circuits of the electrical grid, SCADA-enabled devices, changes over time within the electrical grid, customers of the electrical grid, or geography of the electrical grid.

8. The method of claim 1, wherein:

the identifying the plurality of possible sustained outages includes providing momentary outage data as input to a first machine learning model to identify the plurality of possible sustained outages, the momentary outage data representing the plurality of momentary outages; and the predicting the sustained outage likelihood for each possible sustained outage from the plurality of possible sustained outages includes providing the momentary outage data as input to a second machine learning model to predict, for each possible sustained outage from the plurality of possible sustained outages, the sustained outage likelihood (1) for that possible sustained outage and (2) indicating a confidence that a momentary outage from the plurality of momentary outages will transition to that possible sustained outage.

9. The method of claim 1, wherein:

a first possible sustained outage from the plurality of possible sustained outages is associated with a first phase from a plurality of phases of the electrical grid; and a second possible sustained outage from the plurality of possible sustained outages is associated with a second phase, different from the first phase, from the plurality of phases of the electrical grid.

10. The method of claim 1, further comprising:

receiving geographic location data associated with the plurality of SCADA-enabled sensors;

identifying a weather station based on the geographic location data; and in response to the identifying the weather station, receiving weather data that is recorded at the weather station, the plurality of possible sustained outages being predicted based further on the weather data.

11. The method of claim 1, further comprising:

receiving an image that depicts infrastructure that is associated with the electrical grid; and providing the image as input to a machine learning model to detect an anomaly associated with the infrastructure, the identifying the plurality of possible sustained outages being based further on the anomaly.

12. A non-transitory, processor-readable medium storing instructions that, when executed by a processor, cause the processor to:

receive sensor data measured by a plurality of SCADA-enabled sensors associated with an electrical grid;

identify a plurality of momentary outages (1) associated with a component of the electrical grid, (2) having a duration that is less than a predefined duration, and (3) represented by the sensor data;

predict, for each momentary outage from the plurality of momentary outages, a time period until that momentary outage transforms into a sustained outage that has a duration that is greater than the predefined duration, to produce a plurality of time periods;

identify a plurality of possible sustained outages associated with the electrical grid based on the plurality of time periods being less than a predefined time period; and predict a sustained outage likelihood from a plurality of sustained outage likelihoods for each possible sustained outage from the plurality of possible sustained outages based on the plurality of momentary outages.

13. The non-transitory, processor-readable medium of claim 12, wherein the component includes an interrupting device.

14. The non-transitory, processor-readable medium of claim 12, wherein the instructions to cause the processor to predict the plurality of sustained outage likelihoods include instructions to cause the processor to:

associate each momentary outage from the plurality of momentary outages with a probable cause from a plurality of probable causes; and predict, for each possible sustained outage from a plurality of possible sustained outages, a probable cause from the plurality of probable causes, the plurality of sustained outage likelihoods being calculated based on the plurality of probable causes.

15. The non-transitory, processor-readable medium of claim 12, wherein each time period from the plurality of time periods represents a number of days until that momentary outage transforms into a possible sustained outage from the plurality of possible sustained outages, the non-transitory, processor-readable medium further storing instructions to cause the processor to:

calculate, for each momentary outage from the plurality of momentary outages, a confidence score for that momentary outage and that is proportional to the number of days for that momentary outage, to produce a plurality of confidence scores, the plurality of possible sustained outages being predicted based on the plurality of confidence scores.

16. The non-transitory, processor-readable medium of claim 12, wherein the sensor data includes data from Advanced Metering Infrastructure (AMI).

17. The non-transitory, processor-readable medium of claim 12, wherein the sensor data includes data from Advanced Metering Infrastructure (AMI) sensors and data from Automatic Meter Reader (AMR) sensors.

18. The non-transitory, processor-readable medium of claim 12, further storing instructions to cause the processor to:

send a signal to cause a display of a user interface that shows an interactive visualization of at least some momentary outages from the plurality of momentary outages and at least one possible sustained outage from the plurality of possible sustained outages, the interactive visualization including a representation of at least one of circuits of the electrical grid, SCADA-enabled devices, changes over time within the electrical grid, customers of the electrical grid, or geography of the electrical grid.

19. The non-transitory, processor-readable medium of claim 12, wherein:

the instructions to cause the processor to identify the plurality of possible sustained outages include instructions to cause the processor to provide momentary outage data as input to a first machine learning model to identify the plurality of possible sustained outages, the momentary outage data representing the plurality of momentary outages; and the instructions to cause the processor to predict the sustained outage likelihood for each possible sustained outage from the plurality of possible sustained outages include instructions to cause the processor to provide the momentary outage data as input to a second machine learning model to predict, for each possible sustained outage from the plurality of possible sustained outages, the sustained outage likelihood (1) for that possible sustained outage and (2) indicating a confidence that a momentary outage from the plurality of momentary outages will transition to that possible sustained outage.

20. The non-transitory, processor-readable medium of claim 12, further storing instructions to cause the processor to:

receive an image that depicts infrastructure that is associated with the electrical grid; and provide the image as input to a second machine learning model to detect an anomaly associated with the infrastructure, the plurality of possible sustained outages being predicted based further on the anomaly.

21. The method of claim 1, wherein:

the identifying the plurality of possible sustained outages includes providing an indication of the plurality of momentary outages as input to a machine learning model to identify the plurality of possible sustained outages; and the method further comprises:

receiving field reported outage data; and separating the field reported outage data based on a duration threshold to produce field reported momentary outage data and field reported sustained outage data, the machine learning model being trained based on the field reported momentary outage data and the field reported sustained outage data.

22. The method of claim 1, further comprising:

providing an indication of the plurality of momentary outages as input to a machine learning model to predict a time duration between (1) at least one momentary outage from the plurality of momentary outages and (2) at least one possible sustained outage from the plurality of possible sustained outages.

\* \* \* \* \*